United States Patent
Saha et al.

(10) Patent No.: US 11,632,440 B2
(45) Date of Patent: *Apr. 18, 2023

(54) INTEGRATED OPERATIONAL COMMUNICATIONS BETWEEN COMPUTATIONAL INSTANCES OF A REMOTE NETWORK MANAGEMENT PLATFORM

(71) Applicant: ServiceNow, Inc., Santa Clara, CA (US)

(72) Inventors: Prabodh Saha, Hyderabad (IN); Jonathan Sparks, San Diego, CA (US); Venu Gopal Rao Vajjala, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,921

(22) Filed: Apr. 27, 2022

(65) Prior Publication Data
US 2022/0256010 A1 Aug. 11, 2022

Related U.S. Application Data

(63) Continuation of application No. 17/090,433, filed on Nov. 5, 2020, now Pat. No. 11,363,115.

(51) Int. Cl.
*H04L 67/60* (2022.01)
*H04L 9/40* (2022.01)
(Continued)

(52) U.S. Cl.
CPC .......... *H04L 67/60* (2022.05); *G06F 9/45558* (2013.01); *G06F 13/38* (2013.01);
(Continued)

(58) Field of Classification Search
CPC ................ H04L 67/32; H04L 63/0281; G06F 9/45558; G06F 13/38; G06F 2009/45595; G06F 2213/40
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

Office Action from U.S. Appl. No. 16/930,931, dated Feb. 17, 2022.

*Primary Examiner* — Michael A Keller
*Assistant Examiner* — Thao D Duong
(74) *Attorney, Agent, or Firm* — McDonnell Boehnen Hulbert & Berghoff LLP

(57) ABSTRACT

A system may involve a communication bus and computational instances configured for communication with one another by way of the communication bus. The system is configured to: (i) receive, by a first computational instance, a first communication request, wherein the first communication request specifies first attributes; (ii) store, in a first persistent storage, the first attributes; (iii) generate a second communication request that specifies second attributes; (iv) transmit, by the first computational instance and to a second computational instance by way of the communication bus, the second communication request; (v) receive, by the second computational instance, the second communication request; (vi) store, in a second persistent storage, the second attributes; (vii) generate a third communication request that specifies third attributes; and (viii) transmit, by the second (Continued)

computational instance and to a third computational instance by way of the communication bus, the third communication request.

20 Claims, 20 Drawing Sheets

(51) Int. Cl.
  *G06F 13/38* (2006.01)
  *G06F 9/455* (2018.01)
(52) U.S. Cl.
  CPC .............. *H04L 63/0281* (2013.01); *G06F 2009/45595* (2013.01); *G06F 2213/40* (2013.01)

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,971,826 B1 | 5/2018 | Belmar |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,133,933 B1 | 9/2021 | Grund et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0288053 A1 | 12/2006 | Holt et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2013/0283273 A1 | 10/2013 | Miyazaki |
| 2014/0026133 A1 | 1/2014 | Parker |
| 2014/0122427 A1 | 7/2014 | Dary |
| 2016/0182433 A1* | 6/2016 | McDaid .............. H04L 65/4015 709/206 |
| 2018/0123940 A1 | 5/2018 | Rimar et al. |
| 2019/0104398 A1 | 4/2019 | Owen et al. |
| 2019/0129739 A1 | 5/2019 | Al Reza et al. |
| 2019/0149515 A1 | 5/2019 | Sharma et al. |
| 2019/0165957 A1 | 5/2019 | Abbott et al. |
| 2020/0034462 A1 | 1/2020 | Narayanasamy et al. |
| 2020/0050689 A1 | 2/2020 | Tai et al. |
| 2020/0162376 A1* | 5/2020 | Du .......................... H04L 65/40 |

(56) References Cited

U.S. PATENT DOCUMENTS

| | | | |
|---|---|---|---|
| 2020/0204443 | A1 | 6/2020 | Bar Oz et al. |
| 2020/0249986 | A1 | 8/2020 | Bothello et al. |
| 2020/0267595 | A1* | 8/2020 | Tesanovic .......... H04B 7/15528 |
| 2021/0029060 | A1* | 1/2021 | Lam ........................ H04L 47/34 |
| 2021/0097168 | A1 | 4/2021 | Patel et al. |
| 2021/0194764 | A1 | 6/2021 | Badyan et al. |
| 2021/0289147 | A1* | 9/2021 | Lam ....................... H04N 5/272 |
| 2021/0359879 | A1 | 11/2021 | Yang et al. |
| 2022/0021575 | A1 | 1/2022 | Wang et al. |
| 2022/0029886 | A1 | 1/2022 | Hameiri et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

710 →

| AUTOMOBILE | |
|---|---|
| MAKE | POTOMAC MOTORS |
| MODEL | RACER |
| COLOR | RED |
| TARGET DELIVERY | OCTOBER 1, 2020 |
| QUANTITY | 1 |
| HOOD | |
| MATERIAL | STEEL |
| THICKNESS | 0.65 CM |
| COLOR | DEFAULT |
| QUANTITY | 1 |
| TIRES | |
| TYPE | P215/65R15 |
| QUANTITY | 4 |
| ENGINE ... | |
| STEERING ... | |
| INTERIOR ... | |

FIG. 7B

| 750 → | TIRES | |
|---|---|---|
| | MANUFACTURER | RUBBER, INC. |
| | TYPE | RACER |
| | REQUESTOR | POTOMAC MOTORS |
| | TARGET DELIVERY | SEPTEMBER 1, 2020 |
| | QUANTITY | 4 |
| | PARENT REQUEST | 12345 |
| | REQUEST NUMBER | 67890 |
| | RUBBER | |
| | TYPE | BUTADIENE |
| | QUANTITY | 50 KG |
| | CARBON BLACK | |
| | QUANTITY | 5 KG |

FIG. 7F

INTEGRATED OPERATIONAL COMMUNICATIONS BETWEEN COMPUTATIONAL INSTANCES OF A REMOTE NETWORK MANAGEMENT PLATFORM

CROSS-REFERENCE TO RELATED APPLICATION

This application is a continuation of and claims priority to U.S. patent application Ser. No. 17/090,433, filed Nov. 5, 2020, which is hereby incorporated by reference in its entirety.

BACKGROUND

Cloud-based computing systems allow enterprises to outsource or remotely host certain software applications and services in one or more datacenters that are typically provided by another party. There are numerous advantages to doing so, including reduced cost and the ability to focus more resources on the core competencies of the enterprise, rather than having to handle the day-to-day information technology tasks associated with operating and maintaining such datacenters, applications, and services.

SUMMARY

Currently, a set of accounts within such a cloud-based system is typically dedicated to serve a particular enterprise. Each account may be assigned to users associated with the enterprise (e.g., employees and contractors), or may be shared by multiple users associated with the enterprise. By way of these accounts, such users can access remote applications and services used by the particular enterprise. In some cases, a particular enterprise with such a set of accounts may use one or more of these accounts to grant access to users from other enterprises with which particular enterprise has relationships. In this manner, these other enterprises can gain limited use of the particular enterprise's outsourced remote applications and services, thus facilitating communication between these entities.

But this access is established on a bilateral basis and thus does not meet the needs of modern enterprise computing, which often involves a complex, multi-tier web of enterprises that have various relationships with one another. As a consequence, the flow of information from enterprise to enterprise is often delayed, and users of any one enterprise may be unable to determine why a request involving one or more other enterprises has not completed or has produced an undesirable result.

The embodiments herein are based on the observation that a remote network management platform, which hosts multiple computational instances dedicated to different enterprises, can facilitate efficient communication between these enterprises. In particular, because the computational instances of these enterprises are either co-located or located in physically separate but architecturally common platforms, new platform-supported communication channels can be developed. These channels can more directly support the web-like communication patterns observed between modern enterprises in various industries. As a consequence, the limitations of bilateral communication between enterprises are largely overcome. Benefits of this improved computational architecture include faster communications between enterprises, real-time availability of status, automatic fallbacks from primary requests to secondary requests, and so on. Thus, any application or service that involves communications between two or more enterprises, where these enterprises have computational instances disposed within a remote network management platform, can benefit from these embodiments.

Accordingly, a first example embodiment may involve a communication bus. The first example embodiment may also involve a plurality of computational instances configured for communication with one another by way of the communication bus, wherein the computational instances are associated with corresponding network addresses within the system. The system may be configured to: (i) receive, by a first computational instance of the computational instances, a first communication request, wherein the first communication request specifies first attributes, and wherein the first computational instance is associated with a first network address; (ii) in response to receiving the first communication request, store, in a first persistent storage of the first computational instance, the first attributes; (iii) based on the first attributes and a first set of additional data specifying a second network address with which a second computational instance of the computational instances is associated, generate a second communication request, wherein the second communication request specifies second attributes; (iv) transmit, by the first computational instance and to the second network address by way of the communication bus, the second communication request; (v) receive, by the second computational instance, the second communication request; (vi) in response to receiving the second communication request, store, in a second persistent storage of the second computational instance, the second attributes; (vii) based on the second attributes and a second set of additional data specifying a third network address with which a third computational instance of the computational instances is associated, generate a third communication request, wherein the third communication request specifies third attributes; and (viii) transmit, by the second computational instance and to the third network address by way of the communication bus, the third communication request.

A second example embodiment may involve receiving, by a first computational instance of a plurality of computational instances, a first communication request, wherein the first communication request specifies first attributes, wherein the first computational instance is associated with a first network address, and wherein the plurality of computational instances are configured for communication with one another by way of a communication bus. The second example embodiment may also involve, in response to receiving the first communication request, storing, in a first persistent storage of the first computational instance, the first attributes. The second example embodiment may also involve, based on the first attributes and a first set of additional data specifying a second network address with which a second computational instance of the computational instances is associated, generating a second communication request, wherein the second communication request specifies second attributes. The second example embodiment may also involve transmitting, by the first computational instance and to the second network address by way of the communication bus, the second communication request. The second example embodiment may also involve receiving, by the second computational instance, the second communication request. The second example embodiment may also involve, in response to receiving the second communication request, storing, in a second persistent storage of the second computational instance, the second attributes. The second example embodiment may also involve, based on the second attributes and a second set of additional data specifying a third network address with which a third computational instance of the computational instances is associated, generating a third communication request, wherein the third communication request specifies third attributes. The second example embodiment may also involve transmitting, by the second computational instance and to the third network address by way of the communication bus, the third communication request.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B depicts a graphical user interface that allows specification of a parent request, in accordance with example embodiments.

FIG. 7F depicts a further graphical user interface that allows viewing and editing of one of the child requests, in accordance with example embodiments.

DETAILED DESCRIPTION

Figure 1:
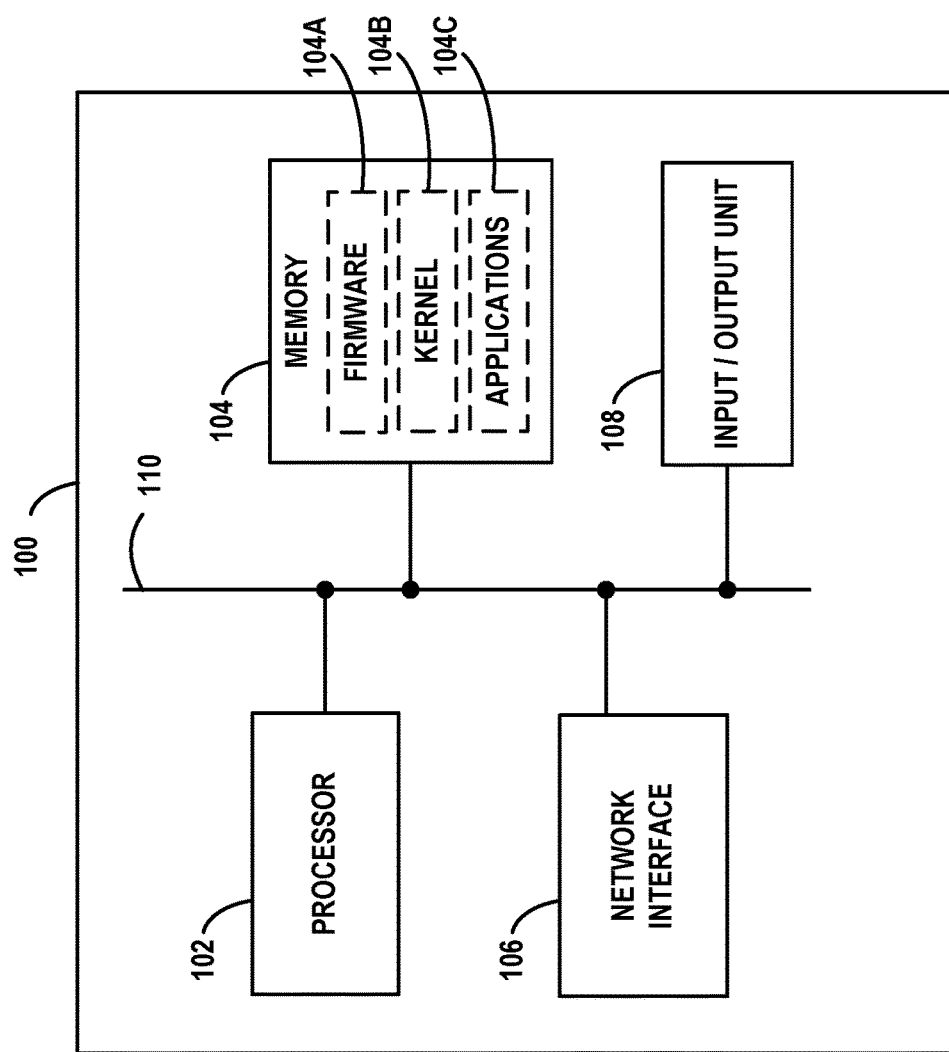
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
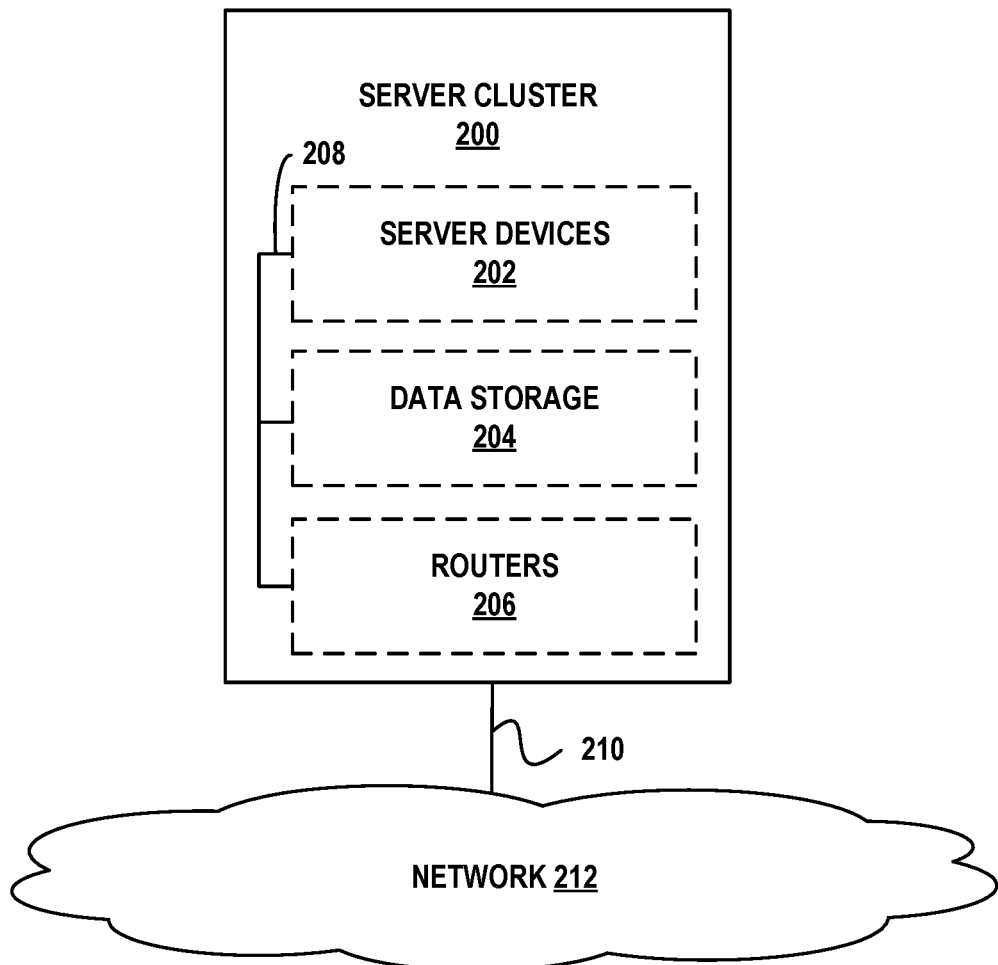
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
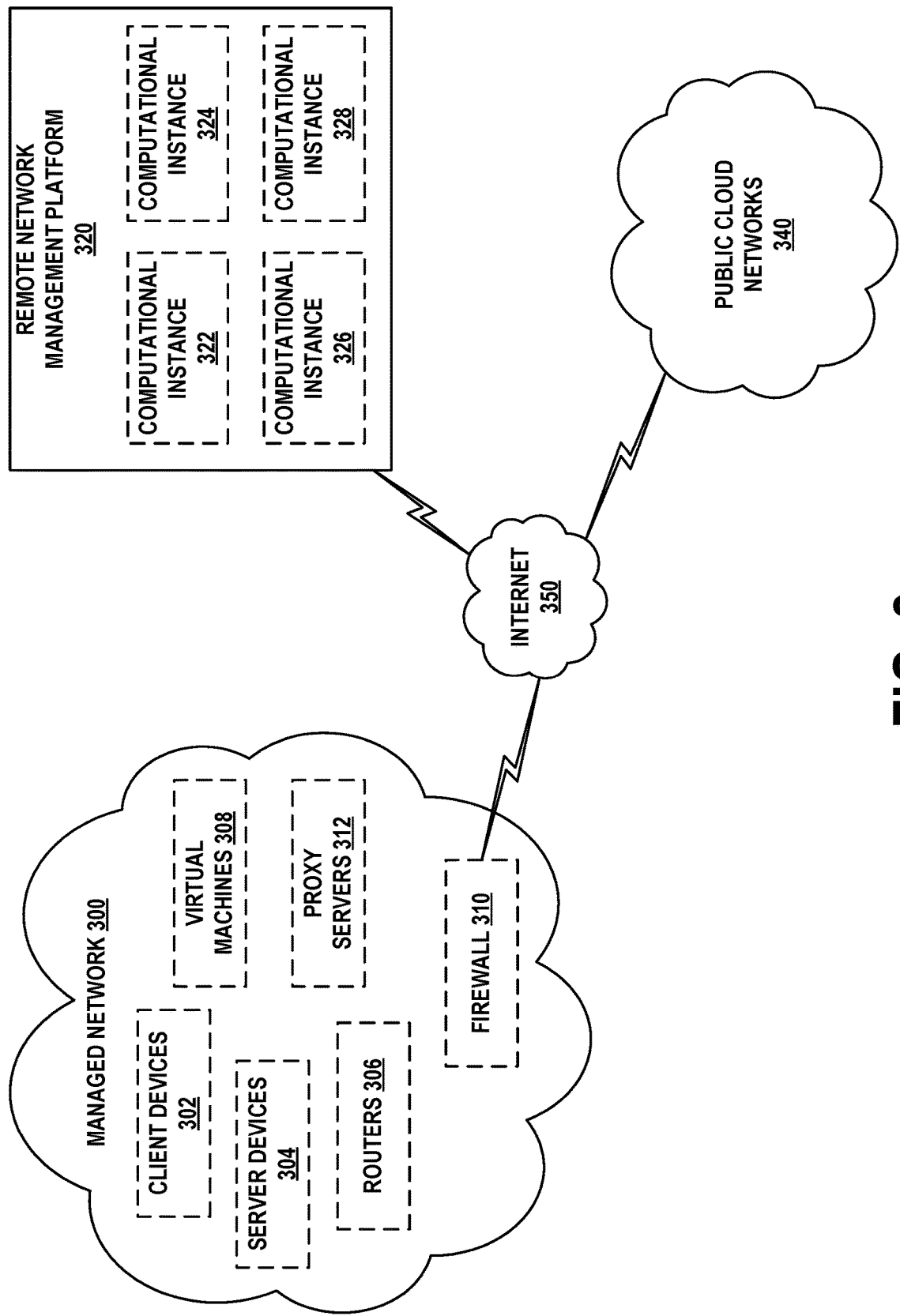
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
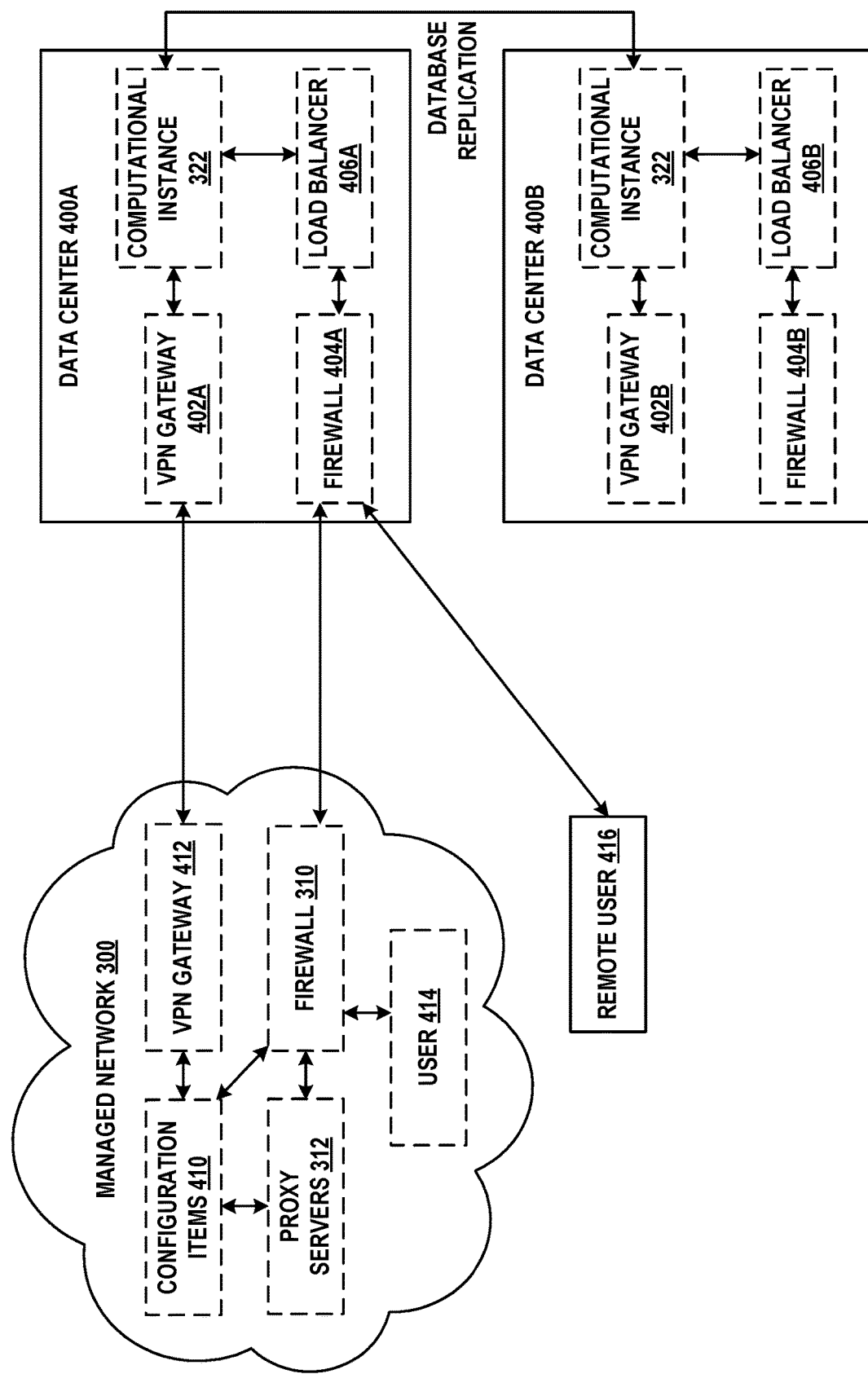
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 (or at least relevant data therefrom) is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
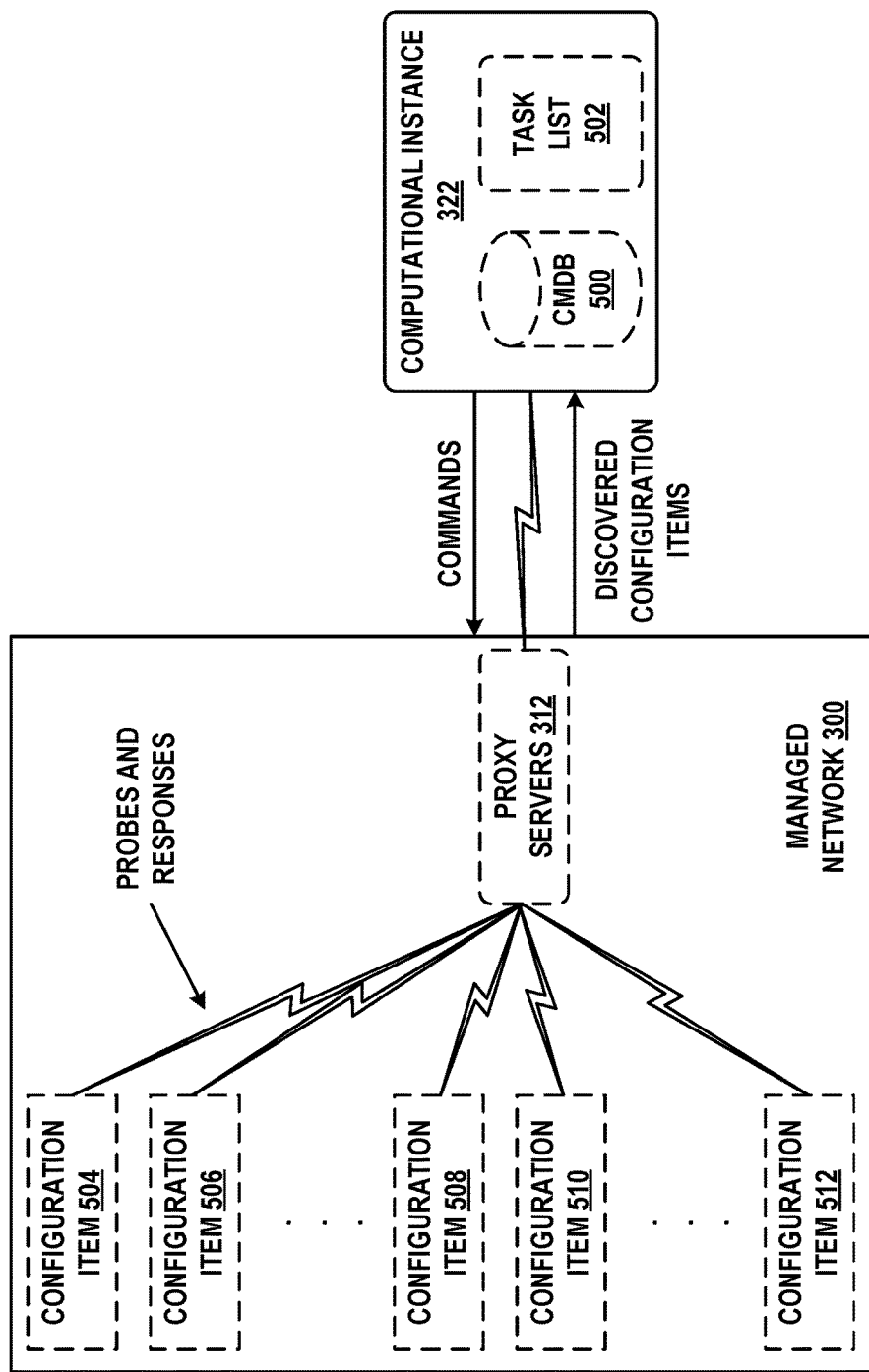
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
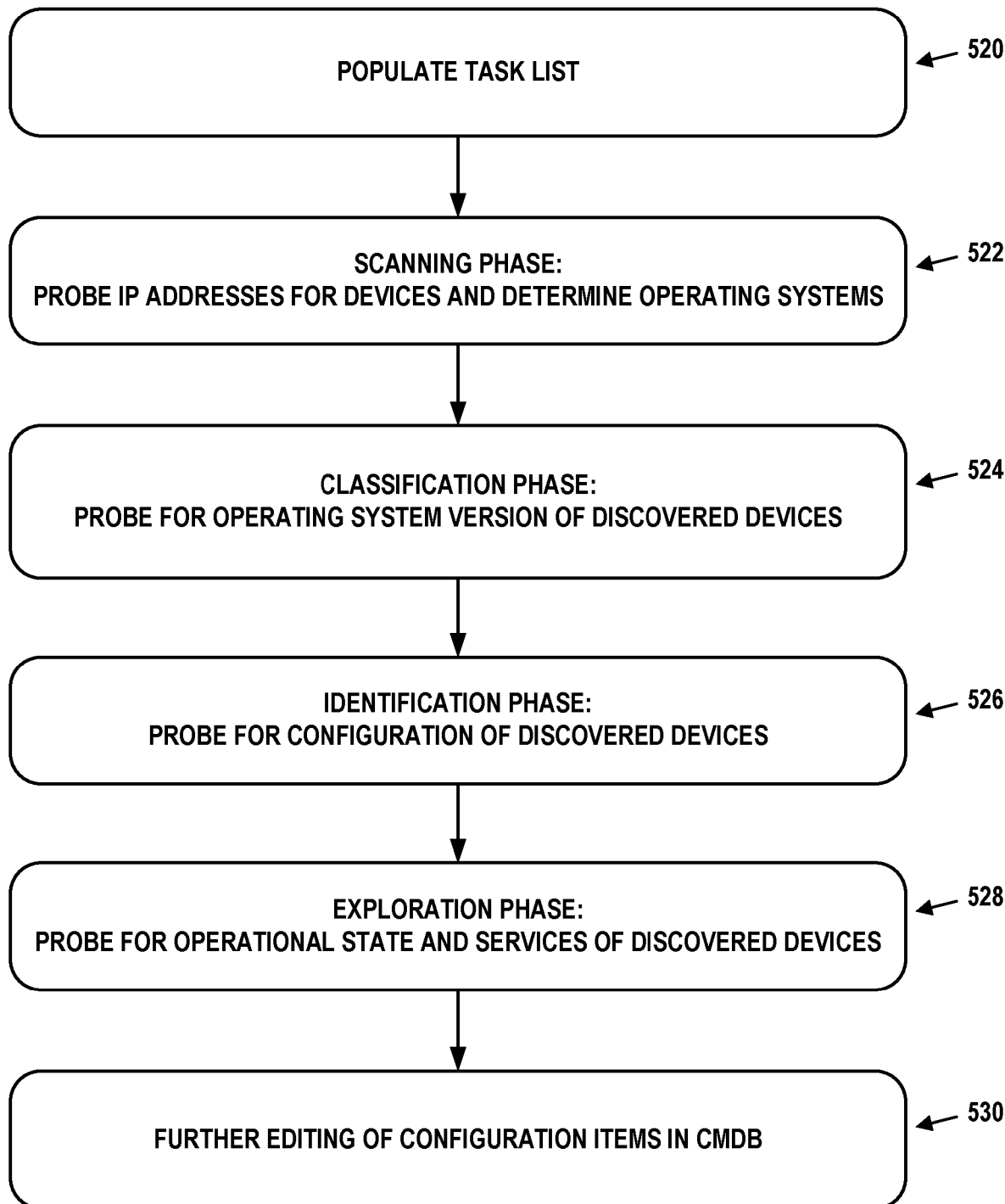
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Architectures

Figure 6A:
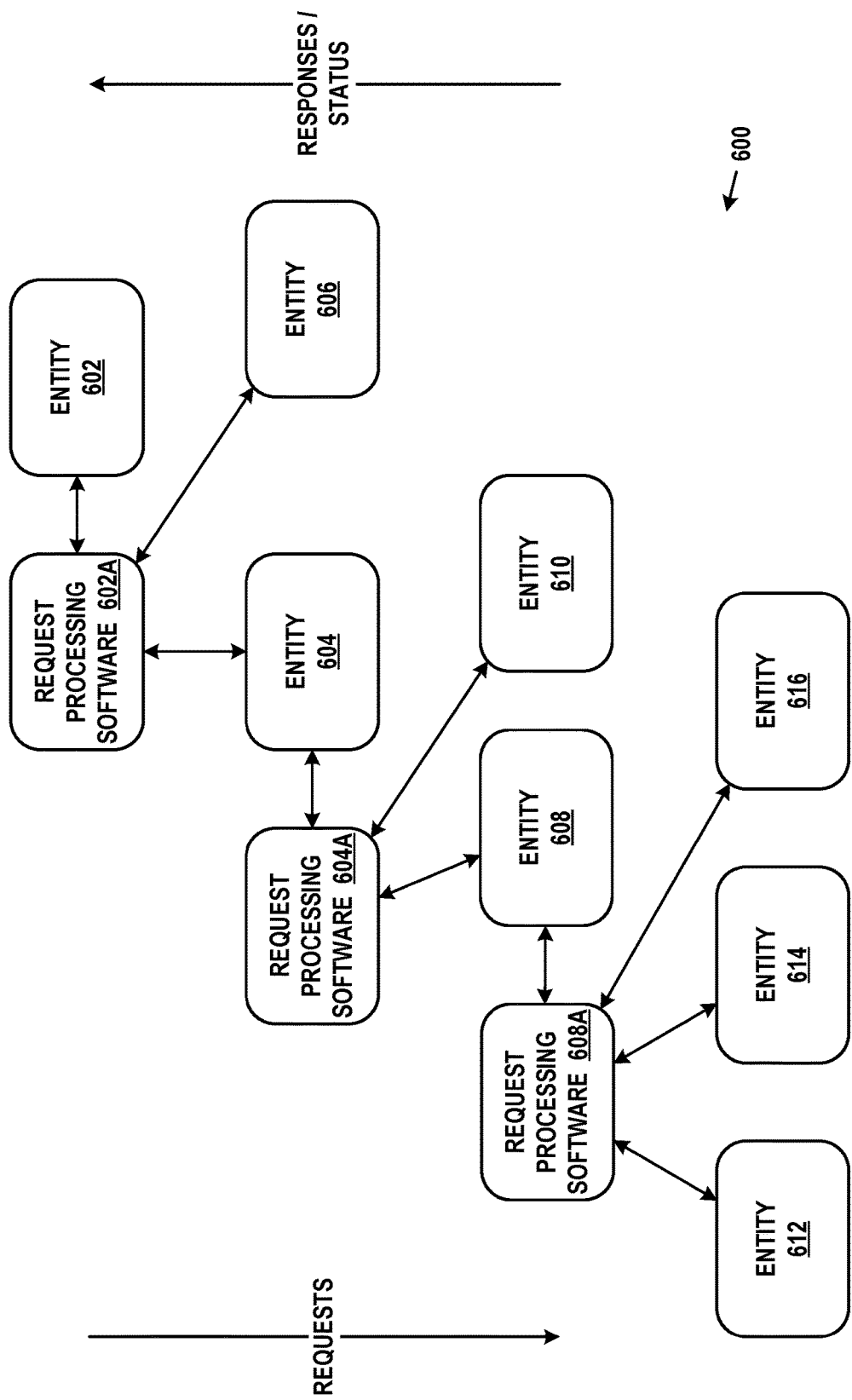
FIG. 6A depicts an arrangement of communicating entities, in accordance with example embodiments.

FIG. 6A depicts example communication architecture 600. In this architecture, a number of entities (e.g., enterprises, other types of organizations, or even individuals) engage in a web-like pattern of communication in order to accomplish various goals. In particular, requests generally flow from entity 602 down to other entities, and responses to these requests and/or status reports flow up from these entities to entity 602 (here, the terminology "down" and "up" are used arbitrarily in reference to directionality in FIG. 6A, and do not imply any other form of directionality).

In architecture 600, entity 602 makes requests that are responded to, at least in part, by entities 604 and 606. In response to receiving these requests, entity 604 makes corresponding requests to entity 608 and to entity 610. In response to receiving requests from entity 604, entity 608 makes corresponding requests to entities 612, 614, and 616.

Entity 602 makes use of request processing software 602A. This software may be hosted by a cloud-based platform, for example, on which entity 602 has an account. The software may provide enterprise resource planning (ERP) or supply chain management (SCM) services, as just two possible example. Other embodiments exist.

Entities immediately downstream to entity 602 (i.e., entities 604 and 606) may also have accounts to access request processing software 602A. With these accounts in place, entity 602 may enter a request into request processing software 602A by way of its account, and entities 604 and 606 may receive the request by way of their accounts. For example, entities 604 and 606 may receive emails from request processing software 602A indicating that entity 602 has made a request. Users associated with entities 604 and 606 may then log on to their respective accounts on request processing software 602A in order to review what the request entails.

Likewise, entity 604 makes use of request processing software 604A. This software may also be a hosted by cloud-based platform, for example, on which entity 604 has an account. Request processing software 604A may provide similar functions as request processing software 602A.

Entities immediately downstream to entity 604 (i.e., entity 608 and entity 610) may also have an account on request processing software 604A. With these accounts in place, entity 604 may enter one or more request into request processing software 604A by way of its account, and entities 608 and 610 may receive corresponding requests by way of their accounts. These one or more requests may be made by entity 604 in response to receiving a corresponding request from entity 602. Entities 608 and 610 may receive email from request processing software 604A indicating that entity 604 has made requests. One or more users associated with entities 608 and 610 may then log on to their accounts on request processing software 604A in order to review what the requests entail.

Further, entity 608 makes use of request processing software 608A. This software may also be hosted by a cloud-based platform, for example, on which entity 608 has an account. Request processing software 608A may provide similar functions as request processing software 602A and request processing software 604A.

Entities immediately downstream to entity 608 (i.e., entities 612, 614, and 616) may also have an account on request processing software 608A. With these accounts in place, entity 608 may enter a request into request processing software 608A by way of its account, and entities 612, 614, and 616 may receive requests by way of their accounts. This request may be made by entity 608 in response to receiving a corresponding request from entity 604. Entities 612, 614, and 616 may receive emails from request processing software 608A indicating that entity 608 has made a request. Users associated with entities 612, 614, and 616 may then log on to their respective accounts on request processing software 608A in order to review what the request entails.

In situations where a downstream entity accepts a request, a response indicating that the request was accepted may be provided to the upstream requestor, typically by way of the associated request processing software. But if the downstream entity declines the request, a response indicating that the request was declined may be provided to the upstream requestor. Again, this may be by way of the associated request processing software.

In the case of accepted requests that have not yet been completed, status reports may be provided periodically, from time to time, or upon request by the requestor. These status reports may indicate the scope of the request, what has been done to fulfill the request, what currently is being done to fulfill the request, and/or how much longer it is expected to take before the request is fulfilled. Status reports may also be used to indicate when requests have been fulfilled.

There are a number of disadvantages to architecture 600. Most notably, the speed at which requests propagate downstream and information flows upstream is often limited by the fact that multiple, distinct request processing software programs are used. In order to propagate requests and corresponding responses and status reports, the information needs to be transferred between these processing software programs. While some processing software programs support cross-vendor integration, many do not. Thus, the requests, responses, and status reports arriving at one request processing software program may have to be manually entered into another request processing software program, or written to a file which is then uploaded to the other request processing software program.

Furthermore, users associated with the entities of architecture 600 may have to learn how to use two or more different processing software programs, each with different user interfaces, data formatting rules, taxonomies, and other quirks. Additionally, entities in this tiered hierarchy have little or no visibility of requests that are more than one level above or below them in the hierarchy of architecture 600. Thus, for example, entity 602 may be unable to easily view (or view at all) the status of a request that has been delegated or made by entity 604 to entity 608.

As a consequence, architecture 600 is limited in its ability to serve the needs of modern enterprises that expect requests to be processed in real-time or near-real-time. It also exhibits inefficiency by employing multiple request processing software programs. Further, in many industries, relationships between entities resemble a more complex web rather than the tree of architecture 600, and these patterns of relationships are difficult to configure in existing request processing software programs.

Examples of actual uses of such an architecture include SCM and remote manufacturing processes. Other possibilities exist.

In the former, the requests are orders flowing from integrators to suppliers, and the responses are confirmations, manufacturing statuses, shipment status, delivery estimates and other information flowing from the suppliers to the integrators. In complex industries, such as automobiles or pharmaceuticals, it can take weeks or months for orders to be fulfilled. It is well-known that the current request processing software that drives today's supply chains is limited with regard to how much it can do to speed this process.

In the latter, the requests are machine control instructions flowing from higher-level controllers to lower-level controllers, and the responses are confirmations, operational statuses, completion estimates, and other information flowing from the lower-level controllers to the higher-level controllers. Within factories or multi-factory embodiments, it is difficult to be able to determine the state of request or debug machine errors by examining or querying individual machines. It is also well known that today's machine control software does not easily (or at all) allow integration between different types of machines from different vendors.

Figure 6B:
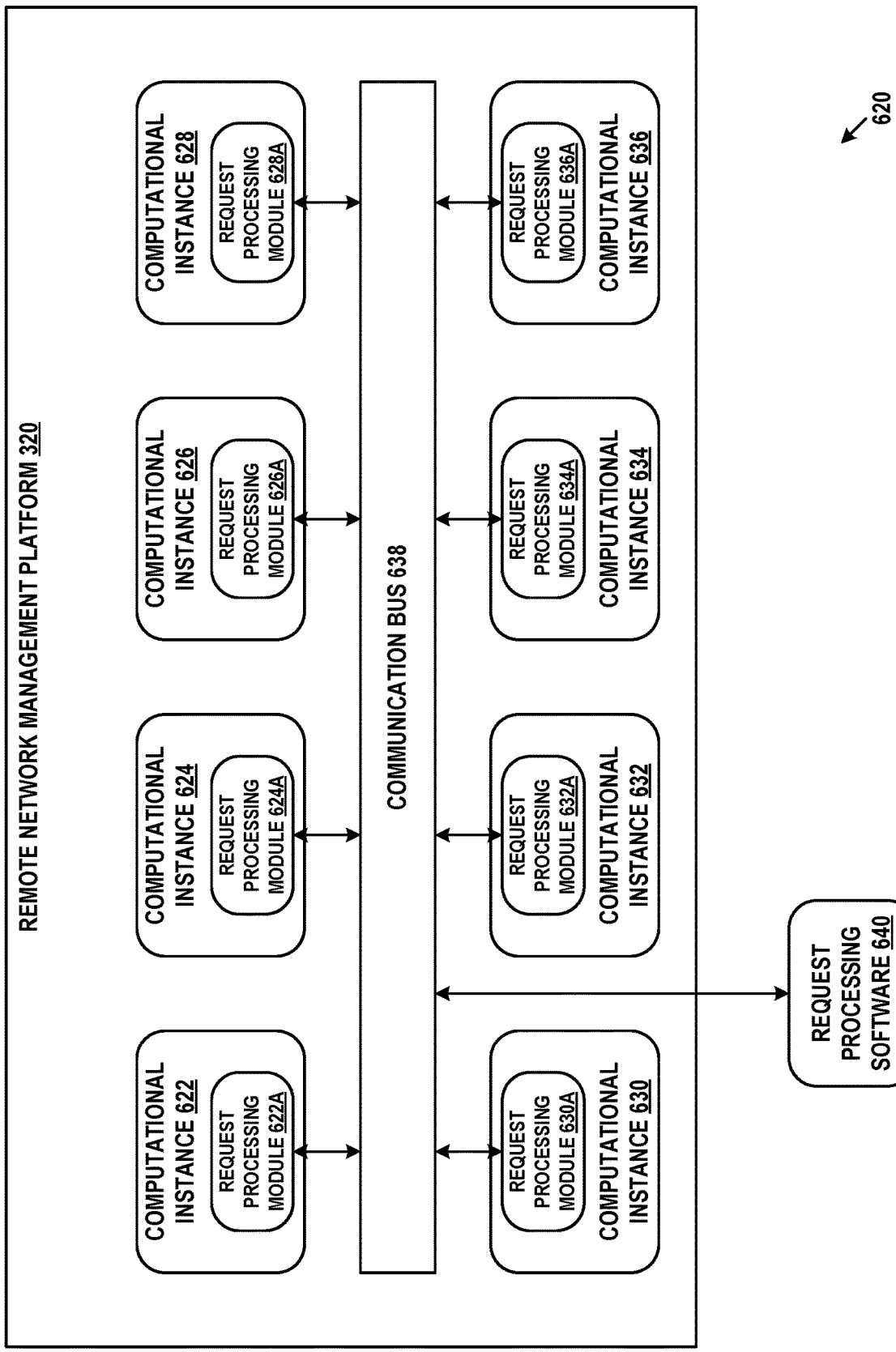
FIG. 6B depicts a communication architecture involving computational instances of a remote network management platform, in accordance with example embodiments.

Architecture 620 of FIG. 6B provides a more flexible alternative that can address these and other issues. A premise behind architecture 620 is that more and more enterprises have recently shifted their operations to at least in part being mediated by a remote network management platform. Thus, in many practical situations, most or all entities of FIG. 6A employ computational instances in such a remote network management platform.

To that point, remote network management platform 320 in FIG. 6B includes computational instances 622, 624, 626, 628, 630, 632, 634, and 636. Each of these computational instances may be dedicated to and/or used by a specific entity. For example, computational instance 622 may be used by entity 602, computational instance 624 may be used by entity 604, computational instance 626 may be used by entity 606, computational instance 628 may be used by entity 608, computational instance 630 may be used by entity 610, computational instance 632 may be used by entity 612, computational instance 634 may be used by entity 614, and computational instance 636 may be used by entity 616. In other words, the tree of entity relationships in architecture 600 can be overlaid onto architecture 620. By extension, non-tree-based arrangements of entity relationships can also be overlaid onto architecture 620.

Remote network management platform 320 may also include communication bus 638, which is represented as a logical object in FIG. 6B. In implementations, however, communication bus 638 may include hardware and software infrastructure that allows the computational instances of network management platform 320 to communicate with one another. Thus, communication bus 638 may support TCP/IP, MICROSOFT® .NET, JAVA® Remote Method Invocation, Common Object Request Broker Architecture (CORBA), and/or other distributed communication frameworks.

While architecture 620 is depicted as being all part of a single remote network management platform, components of this architecture may all be within one datacenter or distributed across multiple datacenters. The remote network management platform may also be centralized or distributed in a similar fashion.

To interface with other computational instances, each of computational instances 622, 624, 626, 628, 630, 632, 634, and 636 may include its own request processing module. Thus, computational instance 622 may include request processing module 622A, computational instance 624 may include request processing module 624A, computational instance 626 may include request processing module 626A, computational instance 628 may include request processing module 628A, computational instance 630 may include request processing module 630A, computational instance 632 may include request processing module 632A, computational instance 634 may include request processing module 634A, and computational instance 636 may include request processing module 636A. These request processing modules may have access to data, program logic, and interfaces to facilitate inter-instance communication.

Figure 6C:
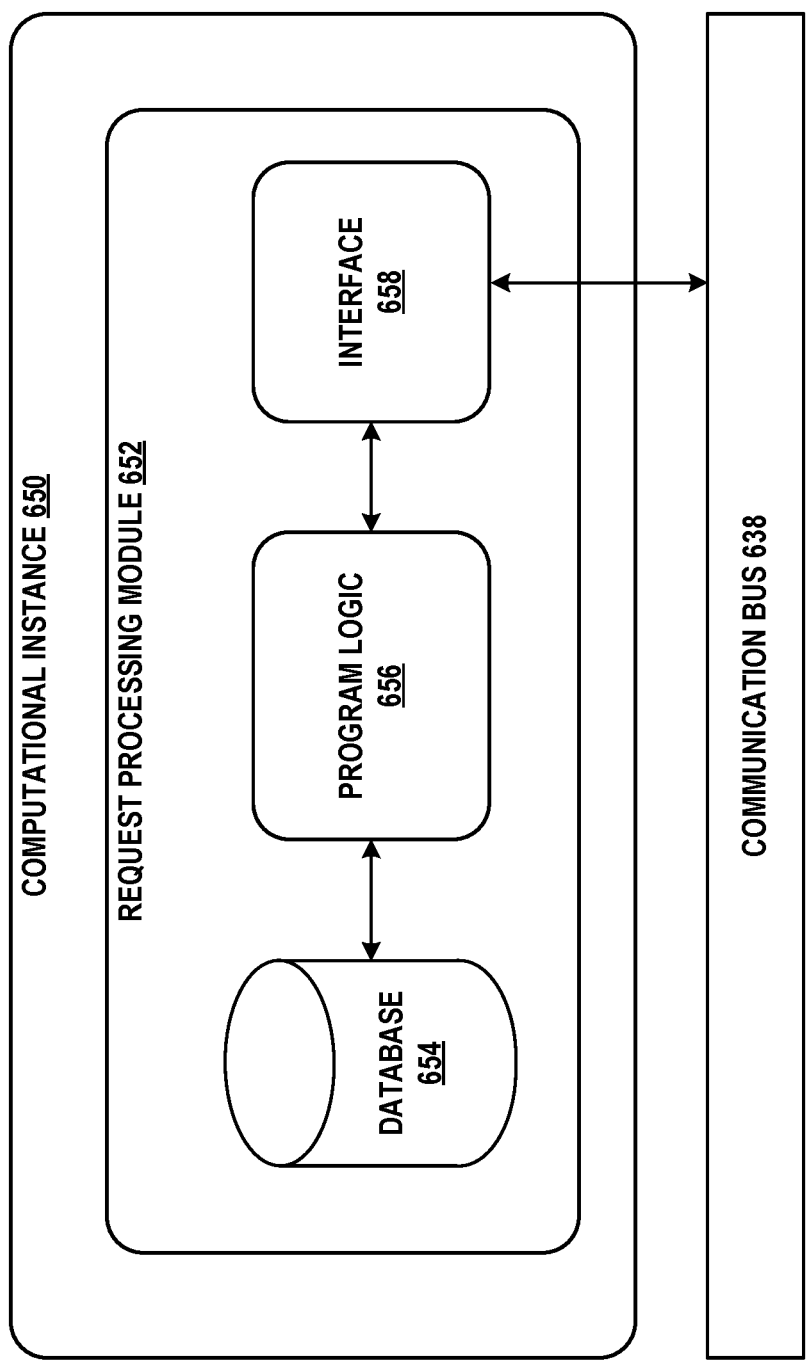
FIG. 6C depicts a request processing module of a computational instance, in accordance with example embodiments.

To that point, FIG. 6C depicts a request processing module in detail. Particularly, computational instance 650 contains request processing module 652. Computational instance 650 may represent any computational instance in architecture 620, and request processing module 652 may represent the associated request processing module.

Request processing module 652 may include database 654, program logic 656, and interface 658. Database 654 may be a relational database, for example, that contains information arranged into one or more tables. Alternatively, a non-relational (e.g., NOSQL) database could be used.

Program logic 656 operates on the information in database 654 according to predetermined functions and rules. For example, program logic 656 may provide a graphical user interface through which requests can be defined. Program logic 656 may be configured to write these requests to database 654, then generate corresponding child requests to transmit to downstream entities that can fulfill the child requests. Program logic 656 may also be configured to receive responses/status reports from downstream entities and use the content of these to update database 654. Further, program logic 656 may also be allowed, by way of the graphical user interface, users to search and/or view partially-specified, pending, partially-fulfilled, or fulfilled requests in stored database 654.

Interface 658 may be a logical communication portal through which messages can be transmitted and received. Notably, interface 658 provides other computational instances in the remote network management platform with access to request processing module 652. Interface 658 may be a representational state transfer (REST) interface, for example, that allows read and/or write access to tables of database 654. For example, particular URLs can be used to read from particular tables of database 654, with program logic 656 mapping between the content of HTTP requests transmitted to these URLs and specific entries in the tables. In various embodiments, security mechanisms can be implemented as part of interface 658 so that entities outside of computational instance 650 are required to authenticate themselves at least once before gaining access to request processing module 652. In this fashion, computational instance 650 can control what types of access is granted to each entity. For example, certain entities may only be able to read from or write to certain tables in database 654 in certain ways.

With these mechanisms in place, requests can be automatically propagated from computational instance to computational instance. For example, a request originated by entity 602 may be entered into computational instance 622 and stored in the database associated with request processing module 622A. This may trigger program logic of request processing module 622A transmit related requests (here referred to as child requests) to computational instance 624 for entity 604 and computational instance 626 for entity 606.

These related requests may make use of respective REST interfaces of computational instances 624 and 626. In other words, the child requests may be directed to particular URLs supported by computational instances 624 and 626 and may contain header and/or payload data that specifies what is being requested as well as related parameters (e.g., model numbers, part numbers, deadlines, contact information of responsible individuals for entity 602, etc.).

Focusing on entity 604 for sake of convenience, computational instance 624 may receive one of these child requests and invoke the program logic of its request processing module to authenticate and then parse the request. If the child request is not authenticated, the program logic may send an error message in response or silently discard the child request. Otherwise, the parsing of the child request may result in the database associated with the request processing module being populated with information related to the child request.

Also, and as indicated in FIGS. 6A and 6B, the populating of the database for entity 604 may cause a further child request to be transmitted to computational instance 628 of entity 608. Again, this further child request may be transmitted by way of a REST interface and authenticated by the program logic of a request processing module associated with computational instance 628. If the further child request passes authentication, it may be parsed by the program logic and appropriate information from the further child request may be written to the database associated with the request processing module of computational instance 628.

The population of this database may cause, in turn, additional child requests to be transmitted to computational instances 632, 634, and 636, which are respectively associated with computational instances 612, 614, and 616. The program logic associated with request processing modules of these latter computational instances may authenticate and parse the requests in a similar fashion as discussed above, populating their respective databases accordingly.

In this fashion, any number of levels in a request processing arrangement can be supported. Further, this arrangement need not be hierarchical, and thus can support arbitrary patterns of request/response relationships between entities. There may be common communication interfaces between the computational instances (e.g., the REST interfaces described above or other types of interfaces).

Turning back to FIG. 6B momentarily, communication bus 638 also supports transmitting requests to and receiving requests from external request processing software 640. External request processing software 640 may be or be similar to any of request processing software 602A, 604A, and/or 608A. Thus, in the case that one or more entities are not associated with computational instances of remote network management platform 320, these entities can still communicate with the computational instances of remote network management platform 320. The interface between the computational instances of remote network management platform 320 and external request processing software 640 may be different from the communication interfaces used for inter-instance communication within remote network management platform 320. For instance, external request processing software 640 may support various types of REST, Simple Object Access Protocol (SOAP), remote procedure call, or custom TCP/IP interfaces.

Furthermore, communication bus 638 and the interfaces of the request processing modules may support both one-to-one (point-to-point) and one-to-many (point-to-multipoint) communication. Thus, communications can be between pairs of computational instances or from one computational instance to two or more other computational instances.

Notably, architecture 620 was not feasible until recently. Architecture 620 was made possible by the growing number of enterprises taking advantage of the availability of remote network management platforms and the services provided thereby. Architecture 620 becomes effective when most or all entities involved in request processing transactions have associated computational instances on a remote network management platform. Now that tens of thousands of enterprises use such remote network management platforms, a sufficient extent of these enterprises can engage in the efficient communications facilitated by architecture 620.

VI. Illustrative Embodiment

In order to further illustrate the possible uses of architecture 620, the following example is provided. In this example, it is assumed that a number of entities utilize computational instances disposed within remote network management platform 320, and that these entities have relationships such that some rely on others to fulfil requests.

In particular, an automobile manufacturer, Potomac Motors, integrates a number of parts to build cars. In doing so, Potomac Motors may request tires from tire manufacturer Tires For All and hoods from hood manufacturer Precision Hoods. In turn, Tires For All may request rubber from Rubber, Inc. and carbon black from Chem Corp. All entity names are fictional.

For sake of simplicity and illustration, only relationships and communications between these five entities will be described. Nonetheless, and as noted above, other relationships may exist and corresponding communications may take place. For example, Tires For All and Precision Hoods may also provide components to other automobile manufacturers. Similarly, Precision Hoods may have relationships with one or more other entities that provide components for its hoods (e.g., steel and paint providers), Rubber, Inc. may have relationships with one or more other entities that provide components for its rubber (e.g., raw rubber providers), and Chem Corp. may have relationships with one or more other entities that provide components for its carbon black (e.g., petroleum providers).

As noted, these five entities each have their own computational instances within a remote network management platform. Each of these computational instances may be associated with a URL through which inter-instance communications can take place. The URLs may be private and therefore only accessible from within the remote network management platform, or public and therefore accessible from within the remote network management platform and from the Internet.

FIG. 7 provides table 700 associating entities and URLs. Each computational instance associated with an entity/URL pair is also shown for sake of convenience. Computational instances do not need to be identified in table 700 because they are implicitly specified by the URLs in the table, but are shown in FIG. 7A so that the URL can be clearly mapped with the computational instances of FIG. 6B.

For example, Potomac Motors uses computational instance 622, which has a URL of "https://prod141.example.com". Likewise, Tires For All uses computational instance 624, which has a URL of "https://prod314.example.com". Other entities similarly have unique URLs and dedicated computational instances.

A. Initial Request

FIG. 7B depicts an example graphical user interface 710 that can be generated, for example, by computational instance 622. A user associated with Potomac Motors may be logged on to an application provided by computational instance 622 that allows specification of options for an automobile by way of graphical user interface 710. Such an application may have many such options, and some may be initially filled in with default values. These options may be selectable by way of drop-down menus or entry of manual text, for example.

Graphical user interface 710 shows just a few of these options. Notably, the user is specifying a single Potomac Motors automobile with a model of Racer, red color, and a target delivery data of Oct. 1, 2020. For a hood, the selected material is steel with a thickness of 0.65 cm and painted with the default color. Here, it is assumed that the default color is that of the automobile as specified above, and therefore is red. One such hood is requested for the automobile. For tires, four are requested, each with a type of "P215/65R15". Other options, such as for engine, steering, and interior, are not shown.

From graphical user interface 710, a user may be able to select options. Some combinations of options might not be possible (e.g., only hoods made of certain materials and thicknesses may be selected). Other options may essentially be static and not changeable by the user (e.g., there might only be one engine type available for a given make and model of automobile).

Once the user is satisfied with the automobile specified by way of graphical user interface 710, he or she may submit the order as a request for the specified automobile. This causes a series of events that stores the automobile specifications, perhaps as entries in tables of a database. Alternatively, the request may be stored in the database as it is being specified or edited.

Figure 7A:
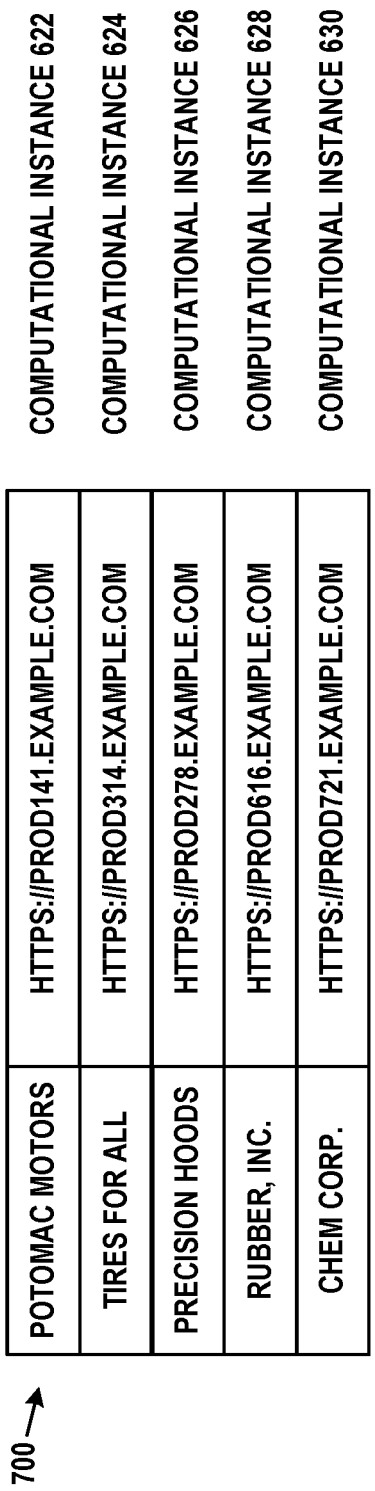
FIG. 7A depicts a set of entities using computational instances and the universal resource locators (URLs) of each, in accordance with example embodiments.
Figure 7C:
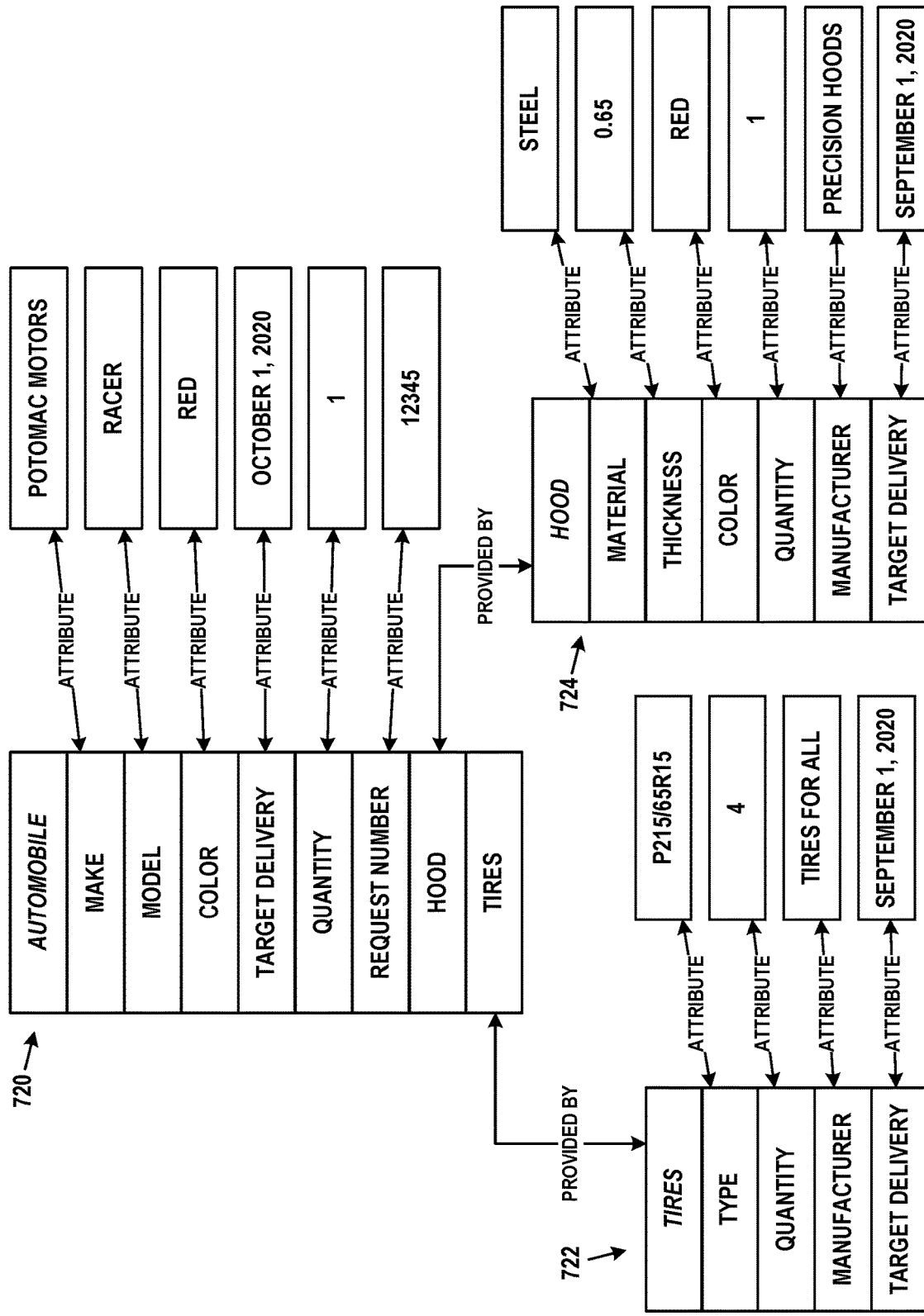
FIG. 7C depicts a database structure for storing the parent request, in accordance with example embodiments.

To that end, database entries not unlike those of FIG. 7C may be created. As an example, the components provided by each entity are stored in different database tables, and these tables are linked by relationships. These tables may appear in a database of request processing module 622A, for example.

In table 720, the automobile as a whole is specified, and includes attributes for make, model, color, target delivery, quantity, and request number. These attributes are as described above in the context of FIG. 7B, except that request number is a unique identifier of the request. This allows multiple requests to be differentiated and individually tracked. The request number may be automatically generated in order to ensure that it is unique per entity.

Table 722 is used to specify a request for the tires, and includes attributes for type, quantity, the preferred manufacturer, and a target delivery date. Note that the manufacturer is Tires For All. This may be a default manufacturer that is automatically populated, and could be overridden by selecting a different manufacturer. The target delivery date is one month prior to the target delivery date of the automobile as a whole, and this one-month offset may also be an adjustable default option.

Similarly, table 724 is used to specify a request for the hood, and includes attributes for material, thickness, color, quantity, manufacturer, and a target delivery date. The color is specified as red due to the default value being chosen for hood color of the overall automobile color being red. The manufacturer is Precision Hoods, a default manufacturer that could be automatically populated, and also could be overridden by selecting a different manufacturer. Like the tire request of table 722, the target delivery date is one month prior to the target delivery date of the automobile as a whole, and this one-month offset may also be an adjustable default option.

Tables 722 and 724 may be linked to table 720 with respective "provided by" relationships. As noted above, other automobile components may exist, and the options for these components may be arranged into further tables (not shown) also linked to table 720 with "provided by" relationships. Advantageously, the table structure of FIG. 7C is conducive to providing further requests (e.g., child requests) to downstream component providers. For example, most of the information needed for a request from Potomac Motors to Tires For All is contained in table 722, while most of the information needed for a request from Potomac Motors to Precision Hoods is contained in table 724.

Thus, the arrangement of FIG. 7C represents some or all of the components and materials needed to complete the requested automobile. When downstream entities (e.g., Tires For All and Precision Hoods) have computational instances on the remote network management platform (which is often the case), communication of requests to these entities can take place rapidly and automatically.

B. Downstream (Child) Requests

Figure 7D:
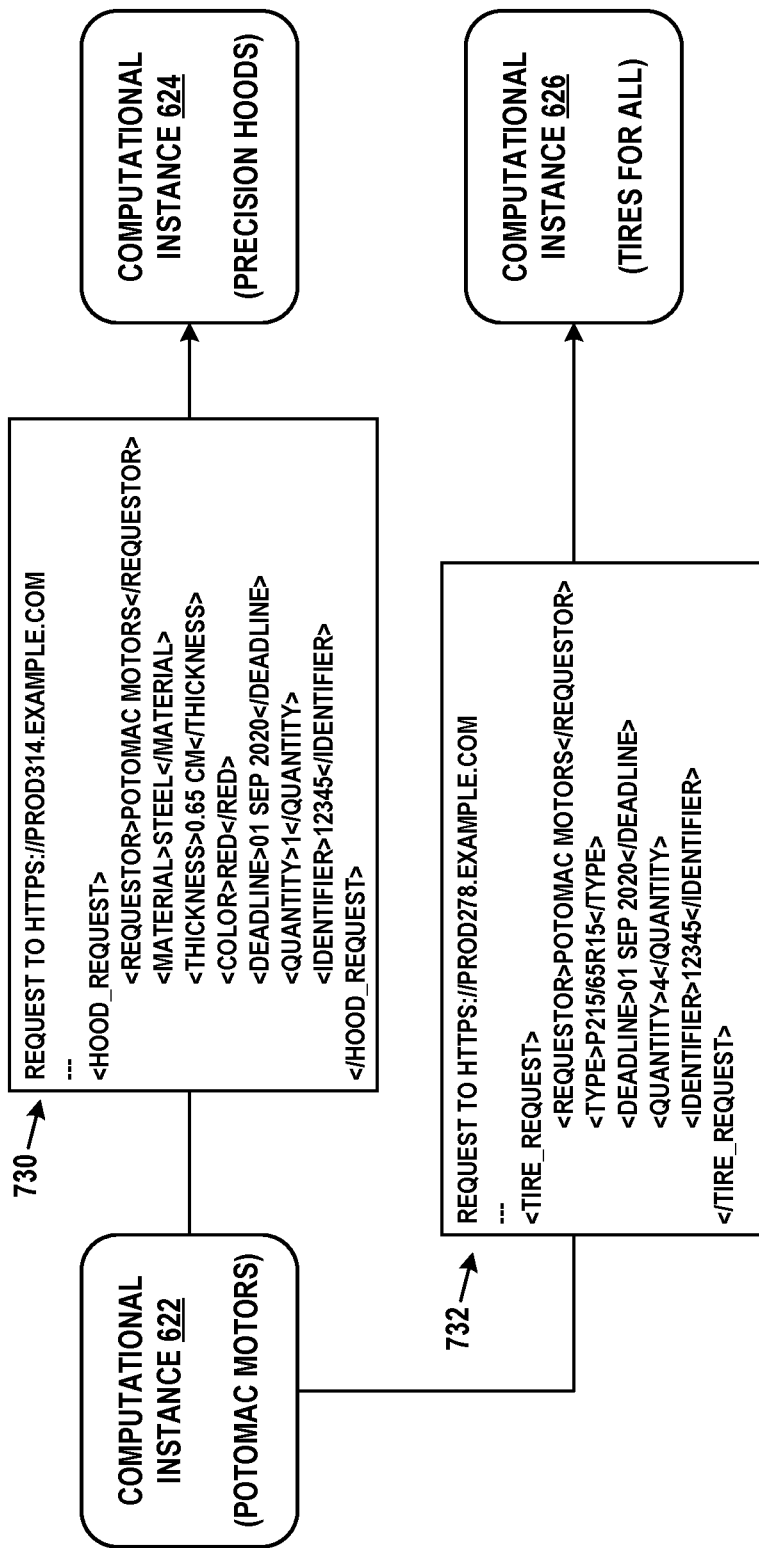
FIG. 7D depicts communication of child requests between computational instances, in accordance with example embodiments.

FIG. 7D depicts transmission of downstream requests from computational instance 622 (used by Potomac Motors) to computational instance 624 (used by Precision Hoods) and from computational instance 622 to computational instance 626 (used by Tires For All). These transmissions may have been triggered by a user of computational instance 622 submitting an automobile order by way of graphical user interface 710 or in another fashion. The requests made to computational instance 624 and computational instance 626 may be referred to as child requests of the request specified by way of graphical user interface 710. These child requests may be generated within the request processing module 622A; for example, the program logic may retrieve the appropriate attributes from the database, formulate the child requests, and transmit the child requests by way of the interface.

Request 730 is to the URL associated with computational instance 624. Thus, request 730 may traverse communication bus 638 between the instances, for example. The content of request 730 includes information that Precision Hoods needs in order to fulfill the request. This may be, for example and as shown in FIG. 7D, specification of the requestor, material, thickness, color, deadline, and quantity. Request 730 may further include an identifier, in this case "12345". This identifier corresponds to the request number in table 720 and allows the entities to be able to unambiguously associate corresponding parent and child requests.

Request 732 is to the URL associated with computational instance 626. Thus, request 732 may also traverse communication bus 638 between the instances, for example. The content of request 732 includes information that Tires For All needs in order to fulfill the request. This may be, for example and as shown in FIG. 7D, specification of the requestor, type, deadline, and quantity. Request 732 may also include an identifier its parent request, in this case "12345" as well.

As shown, both of requests 730 and 732 are formatted using XML according to an example schema. But other structured data formats (e.g., JSON) and/or other schemas may be used. Also, in full generality, more child requests can be made per parent request. Additionally, some of the information appearing in requests 730 and/or 732 may be implicit or generated by way of program logic with the request processing module 622A. For example, table 724 does not specify the units for the thickness attribute of a hood, while the units (cm) are specified in request 730. This allows the thickness attribute to be able to be represented as a number rather than a text string, which has advantages when it comes to comparing the attribute to other attributes or performing mathematical operations on the attribute.

For sake of simplicity and illustration, the remaining discussion focuses on how request 732 is received and processed to generate further downstream child requests. It is assumed that request 730 is processed in a similar fashion.

As noted above, request 732 is transmitted to computational instance 626, which is used by Tires For All. Computational instance 626 may receive request 732 by way of an interface of request processing module 626A. Further, the program logic of request processing module 626A may write a representation of request 732 to a database table within request processing module 626A, for example.

Figure 7E:
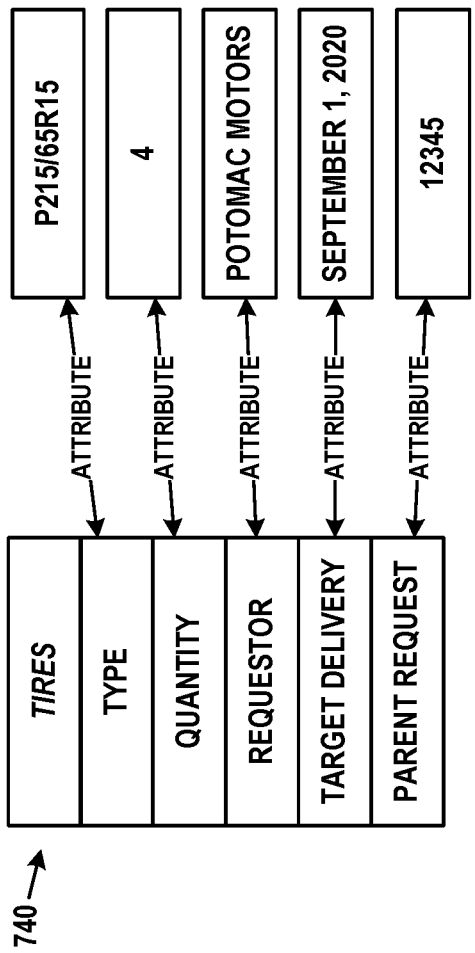
FIG. 7E depicts a database structure for storing the one of the child requests, in accordance with example embodiments.

To that point, FIG. 7E depicts table 740. This table may be disposed within a database of computational instance 626 (within request processing module 626A) and contain attributes defining request 732 as shown. The information stored in table 740 may be just an initial representation of the request, however.

A user may view and/or modify the attributes. For example, and as shown in FIG. 7F, computational instance 626 may generate graphical user interface 750. This graphical user interface displays information from table 740, as well as its own request number ("67890") and options for specifying further materials and components needed to fulfill request 732. These include rubber and carbon black (a petroleum-based material used as a reinforcing filler in tires). For rubber, the type is butadiene and the quantity is 50 kg. For carbon black, the quantity is 5 kg. Other options, such as material for treads, are not shown. The request number may be automatically generated in order to ensure that it is unique per entity.

Notably, details regarding the materials and components used by Tires For All may be hidden from entities making requests to Tires For All for purposes of simplicity, as well as because these details are likely unimportant as long as the delivered tires are of sufficient quality. Nonetheless, architecture 620 may expose these details on demand, as will be discussed below.

From graphical user interface 750, a user may be able to select options. Some combinations of options might not be possible (e.g., only types of certain types may be selected). Other options may essentially be static and not changeable by the user. Some options may be auto-populated by program logic used by Tires For All as configured on its computational instance.

Once the user is satisfied with the tires specified by way of graphical user interface 750, he or she may submit an order as a request for the specified tires. This request may be considered to be a child request of request 732, and thus a grandchild request of the initial request. The submission may cause a series of events that store the tire specification in a database of computational instance 626, perhaps as an update to table 740 and/or involving the creation of additional tables.

Figure 7G:
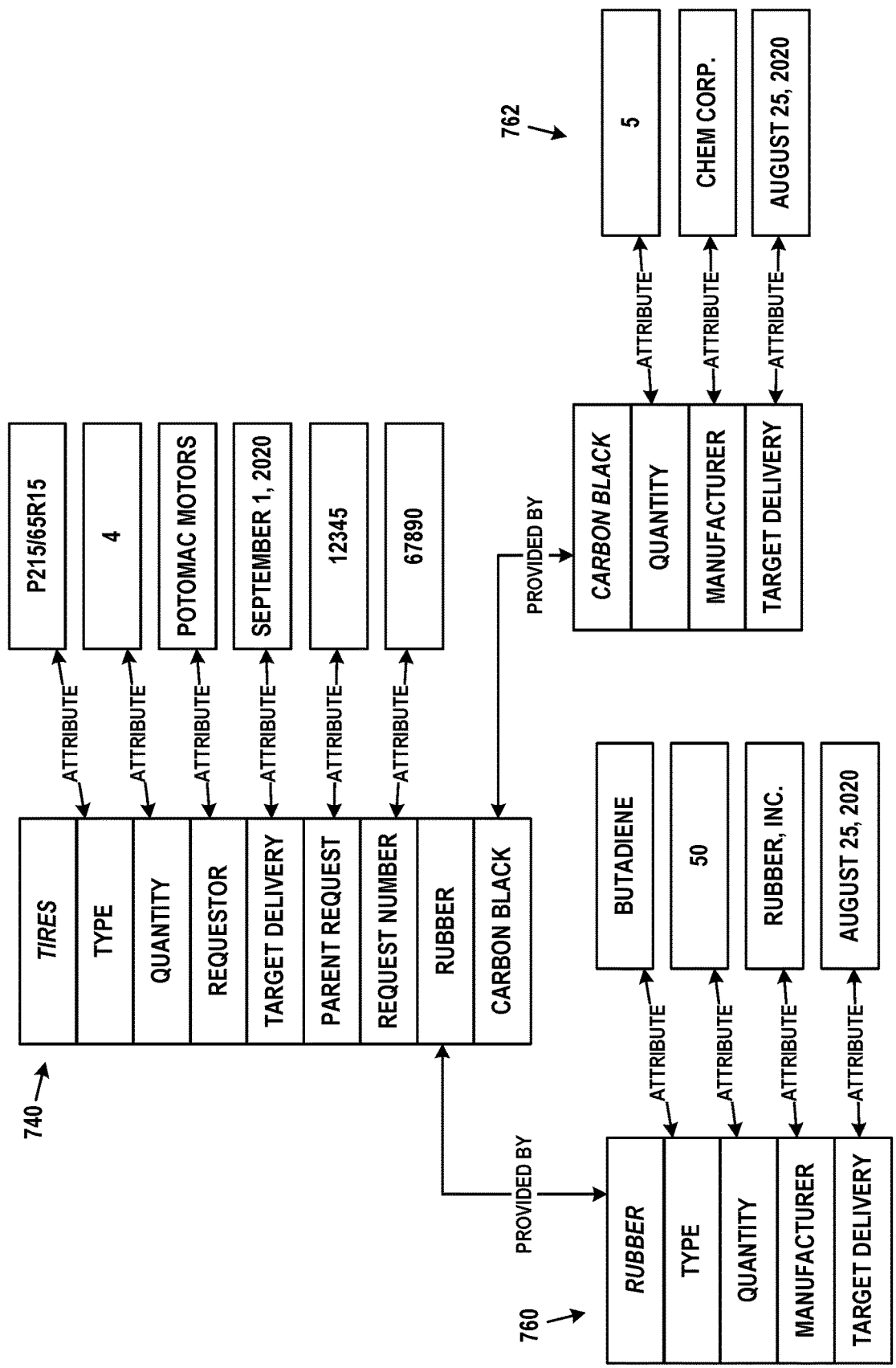
FIG. 7G depicts a more complete version of the database structure of FIG. 7E for one of the child requests, in accordance with example embodiments.

For example, database records not unlike those of FIG. 7G may ultimately be created or otherwise put in place. FIG. 7G includes table 740, as well as new tables 760 and 762. Table 740 now includes the unique request number that was displayed by way of the user interface.

Table 760 contains the type, quantity, manufacturer, and target delivery date for the rubber material and/or components specified in graphical user interface 750. Similarly, table 762 contains the quantity, manufacturer, and target delivery date for the carbon black material and/or components specified in graphical user interface 750. In both tables, the target delivery date is Aug. 25, 2020, approximately 1 week prior to the target deliver data for request 732.

Tables 760 and 762 may be linked to table 740 with "provided by" relationships. Other tire components may exist, and the options for these components may be arranged into further tables (not shown) also linked to table 740 with "provided by" relationships. Advantageously, the table structure of FIG. 7G is conducive to providing even further requests (e.g., child requests of request 732) to additional downstream component providers. For example, most of the information needed for a request from Tires For All to Rubber, Inc. is contained in table 760, while most of the information needed for a request from Tires For All to Chem Corp. is contained in table 762.

Thus, the arrangement of FIG. 7G specifies some or all of the components and materials needed to complete the requested tires. When additional downstream entities (e.g., Rubber, Inc. and Chem Corp.) have computational instances on the remote network management platform (which is often the case), the communications can take place rapidly and automatically.

C. Further Downstream (Grandchild) Requests

Figure 7H:
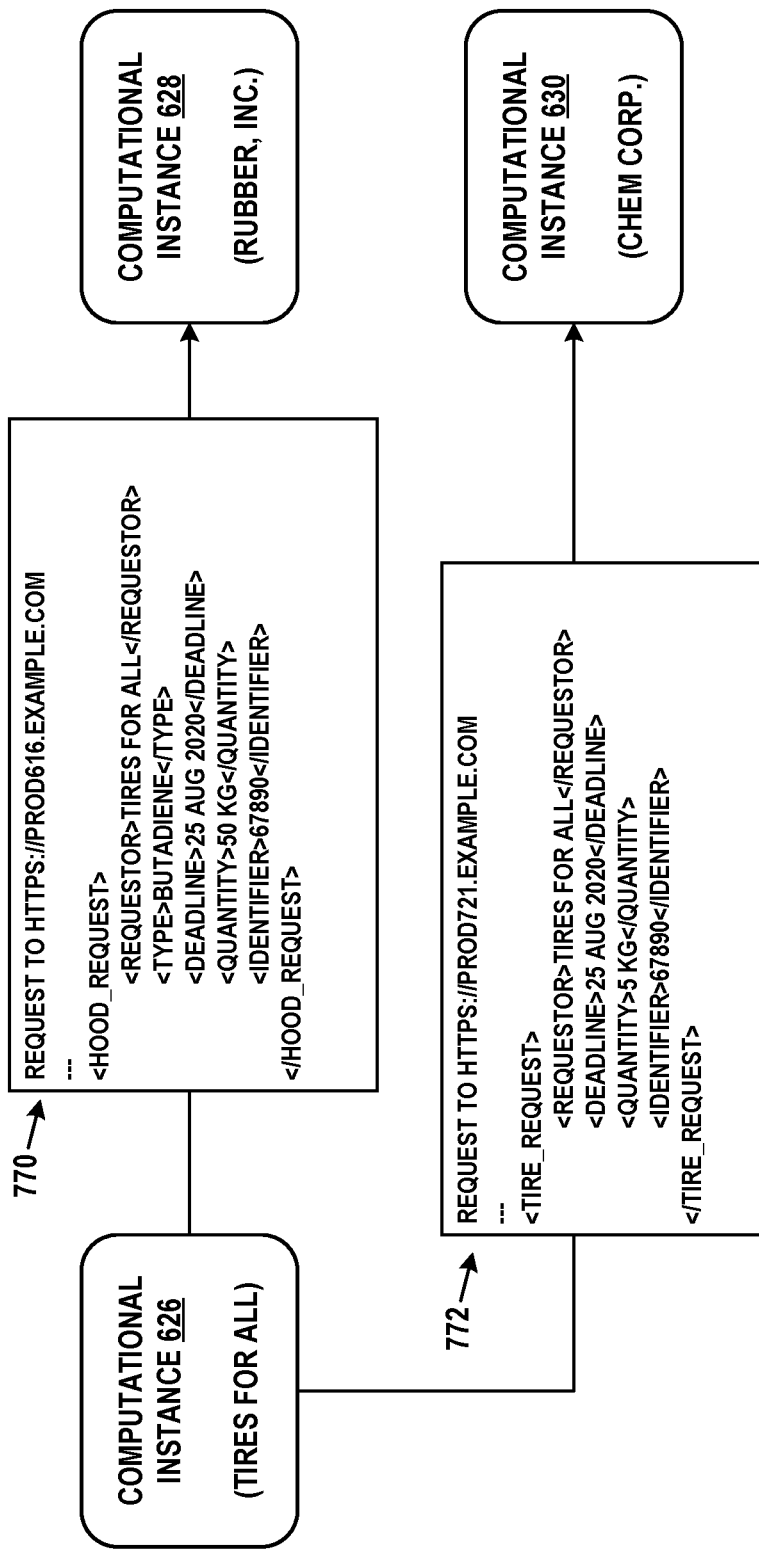
FIG. 7H depicts communication of further child requests between computational instances, in accordance with example embodiments.

FIG. 7H depicts transmission of further downstream requests from computational instance 626 (used by Tires For All) to computational instance 628 (used by Rubber, Inc.) and computational instance 630 (used by Chem Corp.). These transmissions may have been triggered by a user of computational instance 626 submitting a request by way of graphical user interface 750 or otherwise placing an order for four tires as specified. Alternatively, these requests may be made automatically upon receipt of request 732 at computational instance 626 (e.g., program logic of request processing module 626A may be configured to select the addition downstream entities based on configured policy, and then formulate the associated requests).

The requests made to computational instance 628 and computational instance 630 may be referred to as child requests of the request 732 and/or grandchild requests of the request specified by way of graphical user interface 710. These further downstream requests may be generated within the request processing module 626A; for example, the program logic may retrieve the appropriate attributes from the database, formulate the requests, and transmit the requests by way of the interface.

Computational instance 626 may transmit request 770 to the URL associated with computational instance 628. Thus, request 770 may traverse communication bus 638 between the instances, for example. The content of request 770 includes information that Rubber, Inc. needs in order to fulfill the request. This may be, for example and as shown in FIG. 7H, specification of the requestor, type, deadline, and quantity. Request 770 may further include an identifier, in this case "67890". This identifier allows the entities to be able to unambiguously associate corresponding parent and child requests.

Computational instance 626 may transmit request 772 to the URL associated with computational instance 630. Thus, request 772 may also traverse communication bus 638 between the instances, for example. The content of request 772 includes information that Chem Corp. needs in order to fulfill the request. This may be, for example and as shown in FIG. 7H, specification of the requestor, deadline, and quantity. Request 772 may also include an identifier as well, in this case "67890".

As shown, both of requests 770 and 772 are formatted using XML according to an example schema. But other structured data formats (e.g., JSON) and/or other schemas may be used. Also, in full generality, more grandchild requests can be made per child request. Additionally, some of the information appearing in requests 770 and/or 772 may be implicit or generated by way of the program logic of the request processing module 626A. For example, table 760 does not specify the units for the quantity of rubber, while the units (kg) are specified in request 770. This allows the quantity attribute to be able to be represented as a number rather than a text string, which has advantages when it comes to comparing the attribute to other attributes or performing mathematical operations on the attribute.

This process of further child requests being generated from incoming requests can continue for some number of iterations. Thus, for example, computational instance 622 may be considered to be the root of a tree of nodes, where each node in the tree is a computational instance. For a computational instance that transmits a request to another computational instance, the node representing the transmitting computational instance may be arranged to be the parent, in the tree, of the node representing the receiving computational instance. The tree could have an arbitrarily number of levels. Alternatively, for more complex sets of relationships, the requests as a whole might define a directed acyclic graph between computational instances. Other examples are possible.

VII. Example Transactions

Figure 8A:
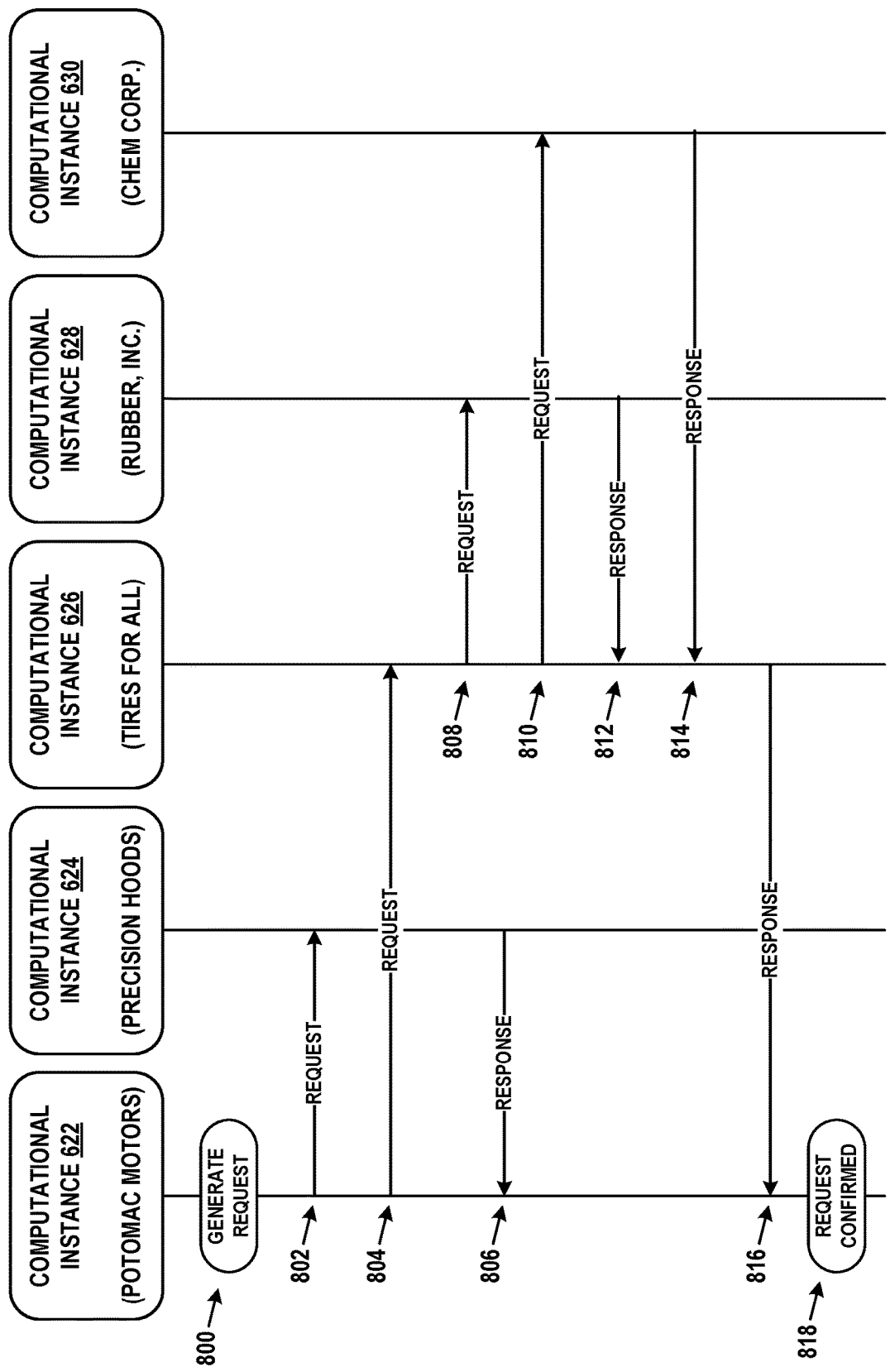
FIG. 8A is a message flow diagram, in accordance with example embodiments.
Figure 8B:
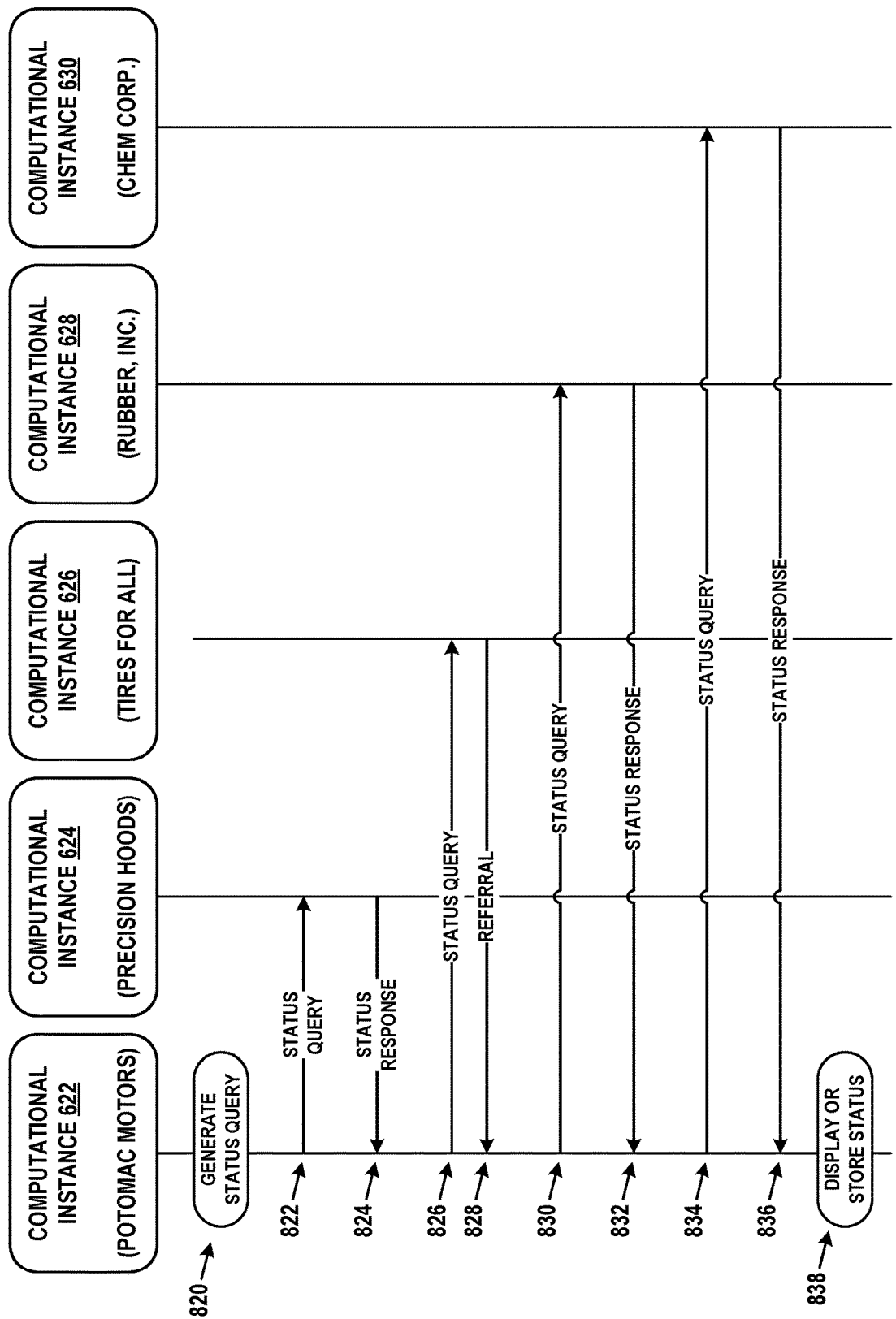
FIG. 8B is another message flow diagram, in accordance with example embodiments.

To further illustrate the embodiments herein, FIGS. 8A and 8B are message flow diagrams of example transactions. FIG. 8A depicts generation of a parent request and then subsequent generation of child requests and grandchild requests. FIG. 8B depicts generation of a status query and then a referral mechanism through which the requestor can determine the status of the parent request and any associated child requests and/or grandchild requests. In line with the disclosure above, the transactions depicted in FIGS. 8A and 8B may involve request processing modules of the respective computational instances.

At step 800 of FIG. 8A, a request is generated by way of computational instance 622. This request may be received by way of input to a graphical user interface, for example, and may include a number of attributes.

At step 802, computational instance 622 transmits a child request to computational instance 624. At step 804, computational instance 622 transmits another child request to computational instance 626. The attributes in these child requests may be derived at least in part from the attributes of their parent request, and possibly other data stored in computational instance 622 as well.

At step 806, computational instance 622 receives a response from computational instance 624. The response may indicate that the child request of step 802 has been received and is scheduled to be fulfilled.

The child request of step 804 may involve materials and/or components that the entity using computational instance 626 obtains from the entities using computational instances 628 and 630. Thus, computational instance 626 cannot yet respond to the child request of 804 in the affirmative. Instead, computational instance 626 first determines whether it can obtain the necessary materials and/or components.

Accordingly, at step 808, computational instance 626 transmits a further child (grandchild) request to computational instance 628. At step 810, computational instance 626 transmits another further child request to computational instance 630. The attributes in these further child requests may be derived at least in part from the attributes of the child request of step 804, and possibly other data stored in computational instance 626 as well.

At step 812, computational instance 626 receives a response from computational instance 628. The response may indicate that the grandchild request of step 808 has been received and is scheduled to be fulfilled. Likewise, at step 814, computational instance 626 receives a response from computational instance 630. The response may indicate that the grandchild request of step 810 has been received and is scheduled to be fulfilled.

At step 816, computational instance 622 receives a response from computational instance 626. The response may indicate that the child request of step 804 has been received and is scheduled to be fulfilled.

At step 818, the request generated at step 800 has been confirmed and scheduled for fulfillment. Therefore, computational instance 622 may indicate this on a graphical user interface and/or write such an indication to a database.

Once a request and its direct or indirect children have been confirmed for fulfillment, users of the requesting computational instance may occasionally look up or check the status of the request. Such a status may indicate the progress being made with respect to gathering materials and components, manufacturing components, shipping manufactured components, and any dates or timelines associated with each of these activities.

In some situations, the inter-instance communications used to support status reporting may be similar to those of FIG. 8A—particularly, each computational instance that receives a status query communicates with other computational instances until they can provide information needed to respond to the status query. In other situations, each computational instance that receives a status query either responds to the query with the appropriate status information, or with a referral to one or more other computational instances that can provide the requested status information. Here, a status query may be a type of request that seeks a status response.

The latter scenario is depicted in FIG. 8B. Particularly, at step 820, computational instance 622 generates a status query. The status query may be generated based on receiving user input by way of a graphical user interface, for example, and may indicate the request for which status information is sought. Since computational instance 622 may not have the information required to address the status of each component associated with the request, computational instance 622 may transmit subsequent status queries to other computational instances that may have this information.

At step 822, computational instance 622 transmits a status query to computational instance 624. It is assumed that computational instance 624 has information on hand to respond to this query. Thus, at step 824, computational instance 624 transmits a status response with this information to computational instance 622.

At step 826, computational instance 622 transmits a status query to computational instance 626. It is assumed that computational instance 626 does not have all information on hand to respond to this query. Thus, at step 828, computational instance 626 transmits a referral to computational instance 622. This referral may provide the information available to computational instance 626 and also indicate that computational instance 622 should redirect its status query to computational instances 628 and 630. For example, the referral may include the request number used by computational instance 626, should this number not otherwise be available to computational instance 622.

At step 830, computational instance 622 transmits a status query to computational instance 628. It is assumed that computational instance 628 has information on hand to respond to this query. Thus, at step 832, computational instance 628 transmits a status response with this information to computational instance 622.

At step 834, computational instance 622 transmits a status query to computational instance 630. It is assumed that computational instance 630 has information on hand to respond to this query. Thus, at step 836, computational instance 630 transmits a status response with this information to computational instance 622.

At step 838, computational instance 622 has the status information necessary to be responsive to the query. Thus, computational instance 622 may display this information on a graphical user interface or store the information in a database for later review.

In other embodiments, which may be combined in various ways with those of FIGS. 8A and 8B, could involve proactive status sharing. Thus, for example, computational instances 628 and 630 may proactively push status updates to computational instance 626, and computational instance 626 may proactively push status updates to computational instance 622.

VIII. Example Operations

Figure 9:
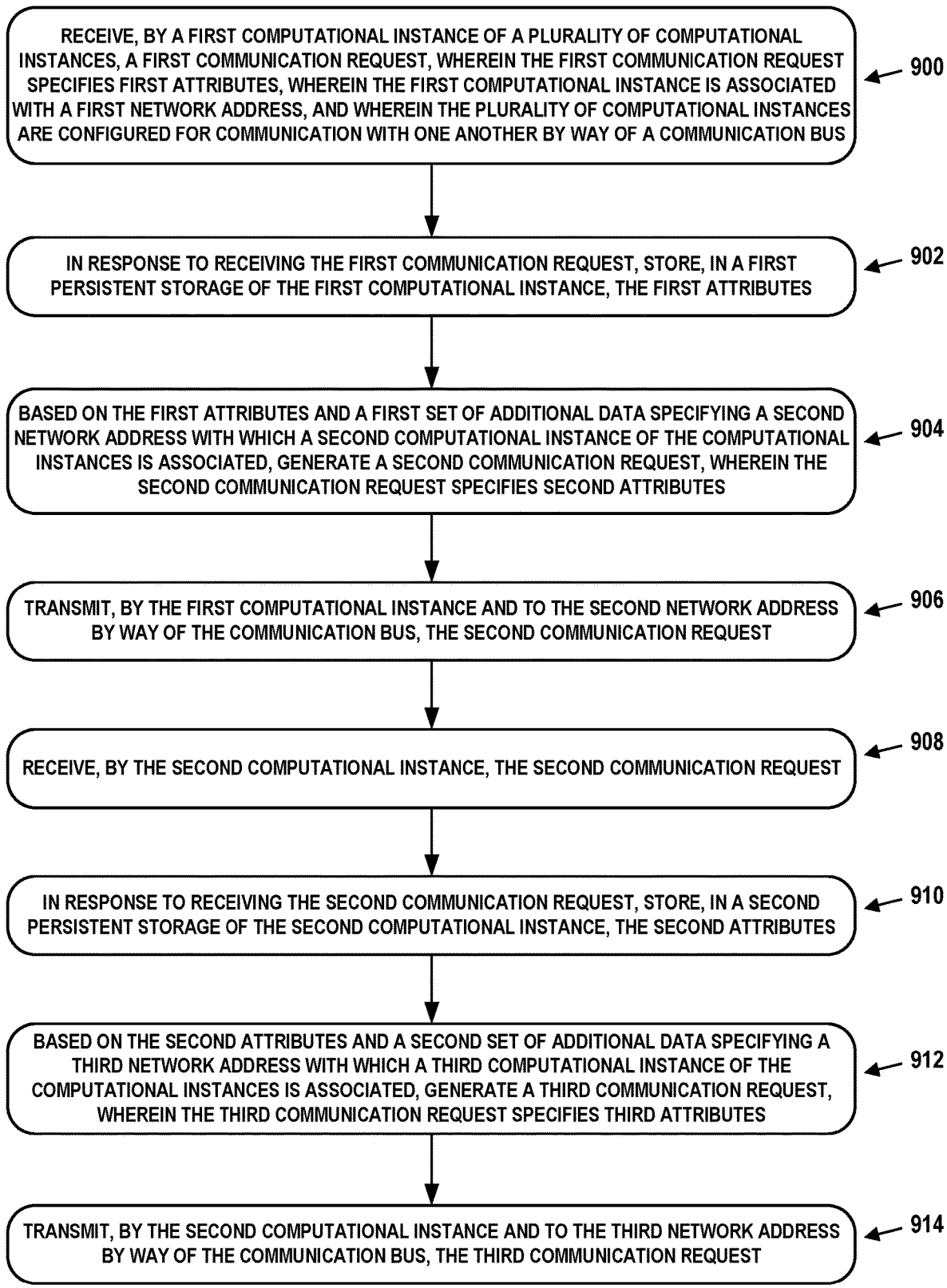
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by computational instances of a remote network management platform.

The embodiments of FIG. 9 may be simplified by the removal of any one or more of the features shown therein. Further, these embodiments may be combined with features, aspects, and/or implementations of any of the previous figures or otherwise described herein.

Block 900 may involve receiving, by a first computational instance of a plurality of computational instances, a first communication request, wherein the first communication request specifies first attributes, wherein the first computational instance is associated with a first network address, and wherein the plurality of computational instances are configured for communication with one another by way of a communication bus.

Block 902 may involve, possibly in response to receiving the first communication request, storing, in a first persistent storage of the first computational instance, the first attributes.

Block 904 may involve, possibly based on the first attributes and a first set of additional data specifying a second network address with which a second computational instance of the computational instances is associated, generating a second communication request, wherein the second communication request specifies second attributes. Other information may influence the generation of the second communication request, such as relationship data between organizations.

Block 906 may involve transmitting, by the first computational instance and to the second network address by way of the communication bus, the second communication request.

Block 908 may involve receiving, by the second computational instance, the second communication request.

Block 910 may involve, possibly in response to receiving the second communication request, storing, in a second persistent storage of the second computational instance, the second attributes.

Block 912 may involve, possibly based on the second attributes and a second set of additional data specifying a third network address with which a third computational instance of the computational instances is associated, generating a third communication request, wherein the third communication request specifies third attributes. Other information may influence the generation of the third communication request, such as relationship data between organizations.

Block 914 may involve transmitting, by the second computational instance and to the third network address by way of the communication bus, the third communication request.

In some embodiments, a first subset of the first attributes is received by way of a graphical user interface provided by the first computational instance, wherein a second subset of the first attributes is received by way of an application configured to execute on the first computational instance.

Some embodiments may further involve: (i) based on the first attributes and the second set of additional data specifying a fourth network address with which a fourth computational instance of the computational instances is associated, generating a fourth communication request, wherein the fourth communication request specifies fourth attributes; and (ii) transmitting, by the first computational instance and to the fourth network address by way of the communication bus, the fourth communication request.

Some embodiments may further involve: (i) based on the first attributes and the second set of additional data specifying a fourth network address with which a computing device external to the system is associated, generating a fourth communication request, wherein the fourth communication request specifies fourth attributes; and (ii) transmitting, by the first computational instance and to the fourth network address, the fourth communication request.

Some embodiments may involve the second communication request and the third communication request being formatted in accordance with a schema defined for inter-instance communications over the communication bus, wherein the fourth communication request is formatted in accordance with a further schema defined for communications with the computing device.

Some embodiments may further involve: (i) based on the second attributes and the second set of additional data specifying a fourth network address with which a fourth computational instance of the computational instances is associated, generating a fourth communication request, wherein the fourth communication request specifies fourth attributes; and (ii) transmitting, by the second computational instance and to the fourth network address by way of the communication bus, the fourth communication request.

Some embodiments may involve the first computational instance including a request processing module, where the request processing module comprises: (i) the first persistent storage configured to store the first attributes; (ii) program logic configured to derive the first attributes from the first communication request, and to generate the second communication request; and (iii) an interface configured to receive the first communication request, and to transmit the second communication request.

Some embodiments may further involve: (i) receiving, by the first computational instance, a first status query; (ii) in response to one or more of receiving the first status query, the first attributes, or the first set of additional data, generating a second status query; and (iii) transmitting, by the first computational instance and to the second network address by way of the communication bus, the second status query.

Some embodiments may further involve: (i) in response to receiving the second status query and based on the second attributes, generating, by the second computational instance, a response to the second status query; and (ii) transmitting, by the second computational instance and to the first network address by way of the communication bus, the response.

Some embodiments may further involve: (i) in response to receiving the second status query and based on the second attributes, generating, by the second computational instance, a referral containing the third network address; (ii) transmitting, by the second computational instance and to the first network address by way of the communication bus, the referral; (iii) in response to receiving the referral, generating a third status query; and (iv) transmitting, by the first computational instance and to the third network address by way of the communication bus, the third status query.

Some embodiments may involve the first computational instance and the second computational instance being pre-authorized for communication by way of the communication bus, wherein the second computational instance and the third computational instance are pre-authorized for communication by way of the communication bus.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a plurality of computational instances configured for communication with one another, wherein the computational instances are associated with corresponding network addresses; and
wherein the system is configured to:
receive, by a first computational instance of the computational instances, a first communication request, wherein the first communication request specifies first attributes, and wherein the first computational instance is associated with a first network address;
transmit, by the first computational instance and to a second network address, a second communication request, wherein the second network address is associated with a second computational instance of the computational instances, and wherein the second communication request specifies second attributes that are based on the first attributes;
receive, by the second computational instance, the second communication request; and transmit, by the second computational instance and to a third network address, a third communication request, wherein the third network address is associated with a third computational instance of the computational instances, and wherein the third communication request specifies third attributes that are based on the second attributes.

2. The system of claim 1, wherein the first computational instance, the second computational instance, and the third computational instance communicate with one another by way of a communication bus.

3. The system of claim 1, further configured to:
in response to receiving the first communication request, store, in a first persistent storage of the first computational instance, the first attributes;
in response to receiving the second communication request, store, in a second persistent storage of the second computational instance, the second attributes; and
in response to receiving the third communication request, store, in a third persistent storage of the third computational instance, the third attributes.

4. The system of claim 1, wherein a first subset of the first attributes is received by way of a graphical user interface provided by the first computational instance, and wherein a second subset of the first attributes is received by way of an application configured to execute on the first computational instance.

5. The system of claim 1, further configured to:
based on the first attributes and additional data specifying a fourth network address with which a computing device external to the system is associated, generate a fourth communication request, wherein the fourth communication request specifies fourth attributes; and
transmit, by the first computational instance and to the fourth network address, the fourth communication request.

6. The system of claim 5, wherein the second communication request and the third communication request are formatted in accordance with a schema defined for inter-instance communications over a communication bus of the system, and wherein the fourth communication request is formatted in accordance with a further schema defined for communications with the computing device.

7. The system of claim 1, further configured to:
based on the second attributes and additional data specifying a fourth network address with which a fourth computational instance of the computational instances is associated, generate a fourth communication request, wherein the fourth communication request specifies fourth attributes; and
transmit, by the second computational instance and to the fourth network address, the fourth communication request.

8. The system of claim 1, wherein the first computational instance includes a request processing module, and the request processing module comprises:
a first persistent storage configured to store the first attributes;
program logic configured to derive the first attributes from the first communication request, and to generate the second communication request; and
an interface configured to receive the first communication request, and to transmit the second communication request.

9. The system of claim 1, further configured to:
receive, by the first computational instance, a first status query;
in response to one or more of receiving the first status query or the first attributes, generate a second status query; and
transmit, by the first computational instance and to the second network address, the second status query.

10. The system of claim 9, further configured to:
in response to receiving the second status query and based on the second attributes, generate, by the second computational instance, a response to the second status query; and
transmit, by the second computational instance and to the first network address, the response.

11. The system of claim 9, further configured to:
in response to receiving the second status query and based on the second attributes, generate, by the second computational instance, a referral containing the third network address;
transmit, by the second computational instance and to the first network address, the referral;
in response to receiving the referral, generate a third status query; and
transmit, by the first computational instance and to the third network address, the third status query.

12. The system of claim 1, wherein the first computational instance and the second computational instance are pre-authorized for communication by way of a communication bus, and wherein the second computational instance and the third computational instance are pre-authorized for communication by way of the communication bus.

13. The system of claim 1, wherein the first computational instance, the second computational instance, and the third computational instance are respectively associated with different managed networks, the managed networks respectively operated by different entities.

14. A computer-implemented method comprising:
receiving, by a first computational instance of a plurality of computational instances, a first communication request, wherein the first communication request specifies first attributes, and wherein the first computational instance is associated with a first network address;
transmitting, by the first computational instance and to a second network address, a second communication request, wherein the second network address is associated with a second computational instance of the plurality of computational instances, and wherein the second communication request specifies second attributes that are based on the first attributes;
receiving, by the second computational instance, the second communication request; and
transmitting, by the second computational instance and to a third network address, a third communication request, wherein the third network address is associated with a third computational instance of the plurality of computational instances, and wherein the third communication request specifies third attributes that are based on the second attributes.

15. The computer-implemented method of claim 14, wherein a first subset of the first attributes is received by way of a graphical user interface provided by the first computational instance, and wherein a second subset of the first attributes is received by way of an application configured to execute on the first computational instance.

16. The computer-implemented method of claim 14, further comprising:

based on the first attributes and additional data specifying a fourth network address with which a computing device external to the plurality of computational instances is associated, generating a fourth communication request, wherein the fourth communication request specifies fourth attributes; and transmitting, by the first computational instance and to the fourth network address, the fourth communication request.

17. The computer-implemented method of claim 16, wherein the second communication request and the third communication request are formatted in accordance with a schema defined for inter-instance communications over a communication bus, and wherein the fourth communication request is formatted in accordance with a further schema defined for communications with the computing device.

18. The computer-implemented method of claim 14, further comprising:

based on the second attributes and additional data specifying a fourth network address with which a fourth computational instance of the computational instances is associated, generating a fourth communication request, wherein the fourth communication request specifies fourth attributes; and transmitting, by the second computational instance and to the fourth network address, the fourth communication request.

19. The computer-implemented method of claim 14, further comprising:

receiving, by the first computational instance, a first status query;

in response to one or more of receiving the first status query or the first attributes, generating a second status query; and transmitting, by the first computational instance and to the second network address, the second status query.

20. An article of manufacture including a non-transitory computer-readable medium, having stored thereon program instructions that, upon execution by one or more processors of a computing system, cause the computing system to perform operations comprising:

receiving, by a first computational instance of a plurality of computational instances, a first communication request, wherein the first communication request specifies first attributes, and wherein the first computational instance is associated with a first network address;

transmitting, by the first computational instance and to a second network address, a second communication request, wherein the second network address is associated with a second computational instance of the plurality of computational instances, and wherein the second communication request specifies second attributes that are based on the first attributes;

receiving, by the second computational instance, the second communication request; and transmitting, by the second computational instance and to a third network address, a third communication request, wherein the third network address is associated with a third computational instance of the plurality of computational instances, and wherein the third communication request specifies third attributes that are based on the second attributes.

* * * * *